United States Patent [19]

Adams et al.

[11] Patent Number: 4,754,416

[45] Date of Patent: Jun. 28, 1988

[54] UNIVERSAL SYNCHRONOUS MARINE NAVIGATION LIGHT SYSTEM

[75] Inventors: David O. Adams, Houston; Naresh Patel, Denton, both of Tex.

[73] Assignee: Automatic Power, Inc., Houston, Tex.

[21] Appl. No.: 905,591

[22] Filed: Sep. 8, 1986

[51] Int. Cl.[4] ........................ G06K 15/00; G08G 7/00

[52] U.S. Cl. ..................................... 364/514; 340/985

[58] Field of Search .................... 364/514; 441/11, 13, 441/17; 340/985, 984

[56] References Cited

U.S. PATENT DOCUMENTS

| | | | |
|---|---|---|---|
| 3,393,321 | 7/1968 | Frungel | 340/984 |
| 3,781,853 | 12/1973 | Jacobs | 340/985 |
| 3,964,040 | 6/1976 | Behl | 340/641 |
| 4,024,491 | 5/1977 | Pellerin et al. | 340/332 |
| 4,340,936 | 7/1982 | Mounce | 340/984 |
| 4,595,978 | 6/1986 | Sheffield | 364/141 |
| 4,620,190 | 10/1986 | Tigwell et al. | 340/985 |
| 4,647,929 | 3/1987 | Jacobs | 340/985 |

*Primary Examiner*—Parshotam S. Lall
*Assistant Examiner*—Ellis B. Ramirez
*Attorney, Agent, or Firm*—Seidel, Gonda, Goldhammer & Abbott

[57] ABSTRACT

Universal synchronous marine navigation light system comprising plural duplex lamp stations. Each duplex lamp station includes a microcomputer, all microcomputers being interconnected by an RS422 communications loop so as to operate all stations in synchronism and in conformance with any existing international standard of operation. Each duplex station comprises a first section having a pair of ac operated lamps and a second section having a pair of lamps one of which is ac operated and the other of which is dc operated. The ac lamps are operated in an on/off flash pattern under normal conditions in "15 mile" or "12 mile standby" modes. If all ac lamps fail, the dc lamp is operated in a "default" flash pattern in a "10 mile" mode.

20 Claims, 19 Drawing Sheets

TABLE I

| STATUS 1=GOOD 0=BAD | | | LAMPS FLASHED 1=FLASH 0=NOT FLASH | | |
|---|---|---|---|---|---|
| L1 | L2 | L3 | L1 | L2 | L3 |
| 0 | 0 | 0 | (DEFAULT) | | |
| 1 | 0 | 0 | 1 | 0 | 0 |
| 0 | 1 | 0 | 0 | 1 | 0 |
| 1 | 1 | 0 | 1 | 0 | 0 |
| 0 | 0 | 1 | 0 | 0 | 1 |
| 1 | 0 | 1 | 1 | 0 | 1 |
| 0 | 1 | 1 | 0 | 1 | 1 |
| 1 | 1 | 1 | 1 | 0 | 1 |

FIG. 9
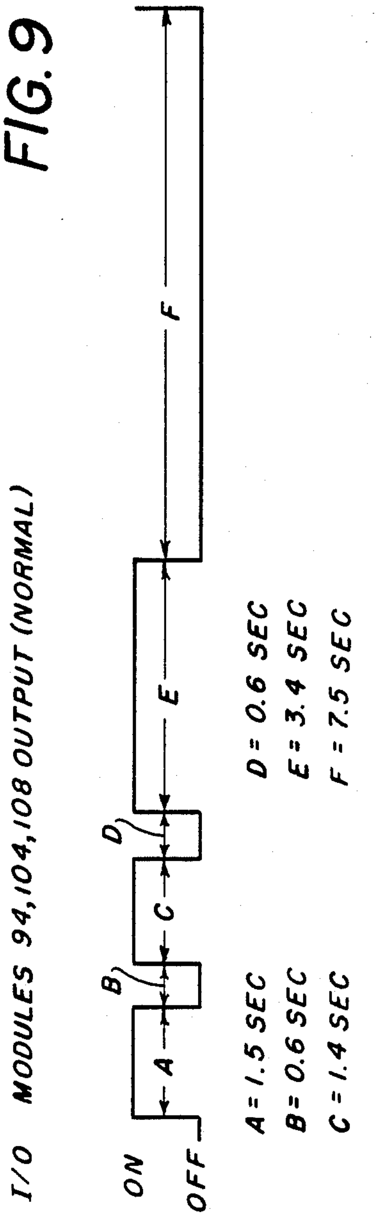
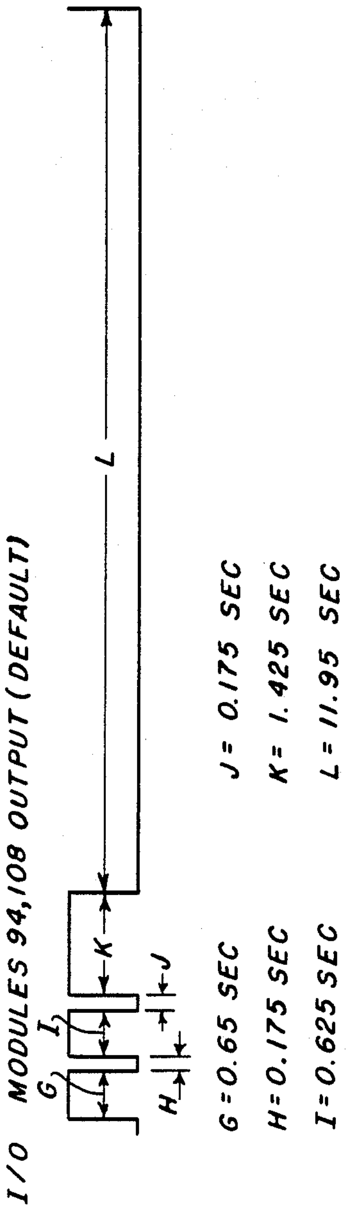
FIG. 10

UNIVERSAL SYNCHRONOUS MARINE NAVIGATION LIGHT SYSTEM

BACKGROUND OF THE INVENTION

The invention is directed to a marine navigation light system. Such systems generally include a number of lamp stations mounted on an artificial offshore structure or platform. In the past, such lamp stations have been controlled by a centrally located logic controller comprising discrete logic components. Each station would for example have one or two ac lamps each configured to separately produce "15 mile" light and a single dc standby lamp for producing "10 mile" light. During normal operation, one "15 mile" ac lamp at each station would be flashed in an on/off pattern so as to create a visible Morse code designating a particular letter of the alphabet. If one of the ac lamps would malfunction during normal operation, the controller would switch off all ac lamps, at all stations, and start operating dc standby lamps at the stations while setting off an alarm. Typically, the controller was mounted in a central location which necessitated running many large gauge wires over long distances to power the station lamps.

In the past, marine navigation light systems included lamp stations which were specially configured to meet but not exceed the requirements of a specific country or regulatory body. For example, so-called "North Sea" requirements specify two "15 mile" lamp stations positioned at diametrically opposed platform corners. Also, each such station had to be provided with a "10 mile" dc standby lamp. The two other platform corners had to be provided with "3 mile" red lamps. The failure of the ac lamp(s) at a "15 mile" station would therefore prevent the station from generating "15 mile" light. The station's "10 mile" dc lamp was provided only as a standby lamp in the event of loss of the ac lamp(s) so that the station could switch from "15 mile" light to "10 mile" light operation. Thus, the dc standby lamps were utilized during normal operation to generate the same on/off pattern as the ac lamps. This posed a significant drain on available dc power. The same parameters are generally specified in the so-called "Dutch Waters" requirements except that "10 mile" dc lamps are substituted for the "3 mile" red lamps.

The problem solved by the present invention is that of providing a universal marine navigation light system capable of being conveniently configured to meet and actually exceed all international marine light navigation system requirements including "North Sea" and "Dutch Waters" requirements, without having to run a large number of controller cables over long distances to control the lamp stations. Applicants' solution is a marine light navigation system built on a fundamental building block in the form of a universal lamp station having a dedicated microcomputer control wherein normal operation takes place at all times under ac power thereby avoiding dc power drain. Each such lamp station is capable of "15 mile" operation off the ac line despite the failure of an ac lamp and "12 mile standby" operation also off the ac line despite the failure of two ac lamps. Operation off a dc supply is only required to generate a "default" signal wherein normal operation is no longer possible. The dedicated microcomputer control enormously simplifies the wiring requirements to operate each station and permits any number of such stations to be interconnected in a communications loop so as to guarantee synchronous operation of all stations. As a result, the same light characteristics are presented in all directions of view with respect to the platform. The attendant reduction in hardware and wiring permits each microcomputer control to be mounted in a relatively small, explosion-proof enclosure so that the station can be installed and operated in potentially hazardous areas. The dedicated microcomputer control also enables the status of all ac lamps to be monitored virtually continuously during operation in "on" intervals as well as "off" intervals of a flash sequence.

BRIEF SUMMARY OF THE INVENTION

A universal synchronous marine navigation light system comprises plural duplex lamp stations. Each duplex lamp station is located in a predetermined position such as a platform corner. Each station includes a first section having two or more ac lamps and a second section having at least one ac lamp, and a programmed microcomputer for operating two of the ac lamps in unison to provide "15 mile" light and any one of the ac lamps to provide "12 mile standby" light. The microcomputers for all stations are interconnected in a communications loop so that all lamp stations can be operated in synchronism.

Preferably, the second section of each microcomputer controlled lamp station is also provided with a dc standby lamp, and the microcomputer at that station is programmed to operate the dc lamp in a "default" flash pattern.

BRIEF DESCRIPTION OF THE DRAWINGS

FIG. 9 is a waveform for the lamp drive signals during operation in "15 mile" and "12 mile standby" modes.

FIG. 10 is a waveform showing the dc standby lamp drive signal during operation in the "default" mode.

DETAILED DESCRIPTION OF INVENTION

Figure 1:
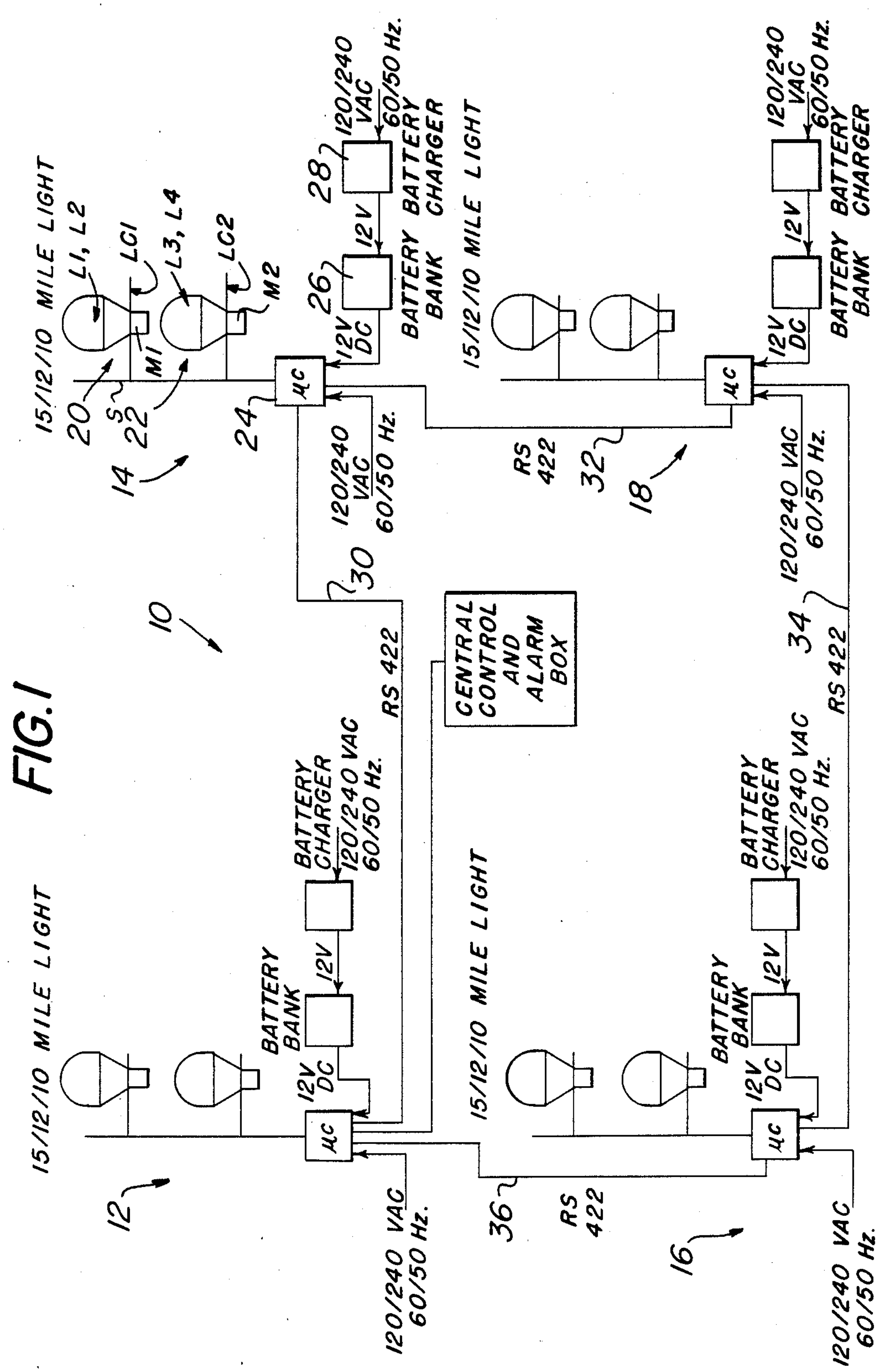
FIG. 1 is a block diagram of a universal four corner configuration of a marine navigation light system according to the present invention.

Referring to the drawings, wherein like numerals indicate like elements, there is shown in FIG. 1 a four corner universal synchronous marine navigation light system according to the present invention designated generally as 10. The system includes four identical microcomputer controlled stations 12, 14, 16, 18 each comprising a duplex arrangement of a FA250-EX lantern assembly mounted on a stanchion secured to a platform. Stations 12, 14, 16 and 18 being identical, description of station 14 will suffice. The station includes an upper lantern assembly 20 comprising a two place lampchanger LC1 fitted with two 80 volt ac, 500 watt (nominal) lamps L1, L2. Lampchanger LC1 is motorized, being driven by a dc motor M2, and is a commercially available item such as the API8087-0046. The station also includes a lower lantern assembly 22 comprising a two place motorized lampchanger LC2 driven by a dc motor M2 and fitted with an 80 volt ac, 500 watt (nominal) lamp L3 and a 12 volt, 3 amp dc (nominal) standby lamp L4. Lampchanger LC2 is a commercially available item such as the API8087-0047. The preferred arrangement of lamps L1-L4 is shown in further detail in FIG. 6D.

A programmed microcomputer 24 controls the upper and lower lantern assembly lampchangers as described in greater detail hereafter. The microcomputer is powered by a 12 volt dc nickel cadmium battery bank 26 which is charged by a battery charger 28 connected to the main ac power supply (120 volts ac at 60 Hz or 240 volts ac at 50 Hz). The battery bank is capable of supplying 12 volts dc to power the lower lantern assembly dc (standby) lamp for 96 hours. The microcomputer 24, battery bank 26 and battery charger 28 are housed in an EX enclosure. The upper and lower lantern assemblies 20, 22, including the motorized lampchangers, and the EX enclosure for the microcomputer, battery bank and battery charger, are mounted on a stanchion S at one of the four platform corners. The microcomputers for all four stations are interconnected by means of a RS422 communication loop formed by RS422 busses 30, 32, 34, 36. The microcomputers are programmed in like manner to operate the lantern assemblies at each station 12, 14, 16, 18 in synchronism and in various modes as described hereafter.

Each microcomputer controlled station 12, 14, 16, 18 of the system 10 is capable of operation in at least three different light modes. In the first or "15 mile" mode, the microcomputer operates one of the two ac lamps L1, L2 in the upper lantern assembly 20 and the ac lamp L3 in the lower lantern assembly 22 so as to flash the lamps in unison to create a 15 second Morse code pattern designating a letter of the alphabet with total apparent intensity of at least approximately 14,000 cd for a range of approximately 15 nautical miles (nm) at an atmospheric transmissivity factor T=0.74. For example, the flashing pattern for the ac lamps may be (nominally) one second on, one second off, one second on, one second off, three seconds on and eight seconds off to designate the letter "U". The ac lamps L1 or L2 and L3 for the upper and lower lantern assemblies 20, 22 of all four stations 12, 14, 16, 18 are operated synchronously in the "15 mile" mode in this manner.

Should the ac lamp L1 in the focal position of the upper lantern assembly 20 of any station fail, i.e., burn out, the microcomputer 24 at that station detects the failure and operates the upper lantern assembly lampchanger LCl so as to move the second or reserve ac lamp L2 into the focal position. The microcomputer continues to flash the reserve ac lamp L2 in unison with the lower lantern assembly ac lamp L3 so as to maintain the total apparent intensity of 14,000 cd in the first or "15 mile" mode of operation.

If the reserve ac lamp L2 in the upper lantern assembly also fails, the microcomputer detects the failure and operates the station in the second or "12 mile standby" mode. The microcomputer continues to flash the ac lamp L3 in the lower lantern assembly 22 in the code pattern previously described so as to provide an apparent intensity of at least approximately 7,000 cd for a range of approximately 12 nm at an atmospheric transmissivity factor T=0.74. The microcomputer also generates an alarm output signal. The microcomputers at all other stations, however, continue to operate their upper and lower lantern assembly ac lamps L1 or L2 and L3 (if working) in the "15 mile" mode in synchronism with the station operating in the "12 mile" mode.

Similarly, if only a lower lantern assembly ac lamp L3 fails at a station, the microcomputer at that station detects the failure and continues to operate an upper lantern assembly ac lamp L1 or L2 in the same flash pattern already described in the "12 mile standby" mode so as to provide an apparent intensity of at least approximately 7,000 cd for a range of approximately 12 nm at an atmospheric transmissivity factor T=0.74. The microcomputer also generates an alarm ouitput signal. All other microcomputers at the remaining platform stations, however, continue to operate their upper and lower lantern assembly ac lamps L1 or L2 and L3 (if working) in synchronism in the "15 mile" mode as previously described.

In the third or "10 mile standby" mode, the microcomputer 24 at a station causes all other microcomputers in the RS422 loop to enter the same "10 mile standby" mode. This occurs only when all three ac lamps L1-L3 in the upper and lower lamp assemblies 20, 22 of any station have failed. The condition is detected by the microcomputer at that station. In response, the microcomputer operates the lower lantern assembly lampchanger LC2 so as to position the dc (standby) lamp L4 in the focal position of the lower lantern assembly. The microcomputer flashes the dc (standby) lamp L4 in a rapid "default" on/off pattern so as to provide a Morse code signal designating a letter of the alphabet with an apparent intensity of approximately 1,400 cd for a range of approximately 10 nm at an atmospheric transmissivity factor T=0.74. During this mode, the microcomputer also generates a message which is transmitted to all microcomputers over the RS422 loop. In response, each microcomputer operates its lower lantern assembly lampchanger LC2 so as to move the dc (standby) lamp L4 into the focal position. Each microcomputer flashes its dc (standby) lamp L4 in the same rapid "default" pattern to generate the Morse code signal in the "10 mile standby" mode. Thus, all microcomputers in the loop operate in synchronism in this mode so as to flash all lower lantern assembly dc (standby) lamps L4 in unison in the same "default" pattern. The upper and lower lantern assembly ac lamps L1-L3 are not energized at any of the stations in this mode even though none of them may have failed at a particular station. The microcomputer which initiates entry into the "10 mile standby" mode of operation generates an alarm output signal and transmits a message over the RS422 loop to all other microcomputers each of which enters the "default" mode and generates an alarm output signal in response.

The microcomputer 24 at each station also detects a failure or loss of power at the main ac line. If loss of ac power is detected at a station, the microcomputer at that station operates the lower lantern assembly lampchanger LC2 to enter the "10 mile standby" mode of operation wherein only dc (standby) lamp L4 is flashed on and off in the "default" flash pattern by the microcomputer. All remaining stations also enter the "10 mile standby" mode of operation, as previously described, and operate their dc (standby) lamps L4 in the "default" flash pattern.

Figure 2:
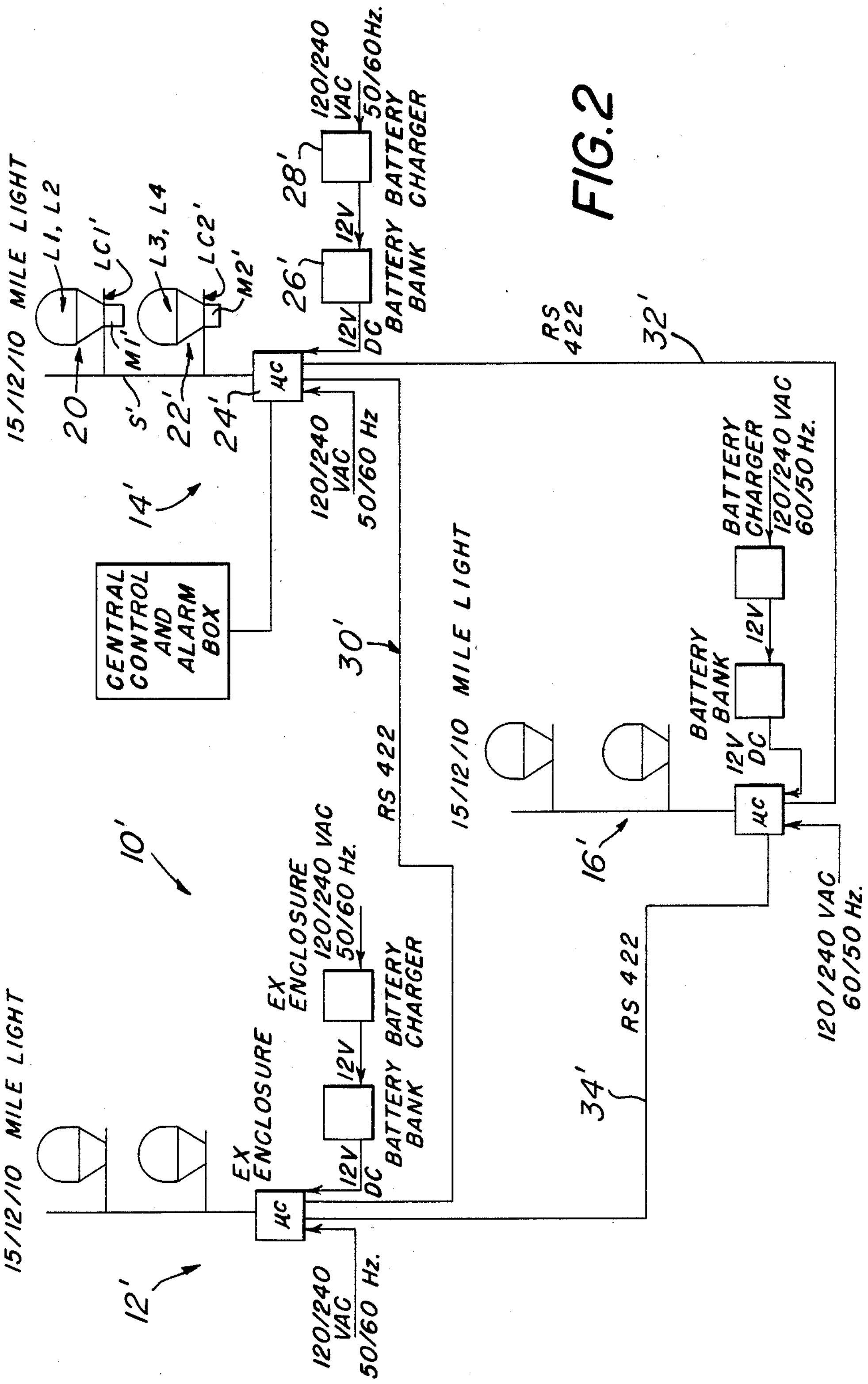
FIG. 2 is a block diagram of a three corner universal marine navigation light system according to the present invention.

The foregoing description of operation of a microcomputer controlled station in four corner universal synchronous marine navigation light system 10 applies to the three corner system 10' shown in FIG. 2 wherein like elements in FIGS. 1 and 2 are designated by primed numerals. Stations 12', 14' are located at separate platform corners. Station 16' is located at the apex of a triangle formed by all three stations. As in FIG. 1, all stations 12', 14', 16' in FIG. 2 are identical. Each station includes an upper lantern assembly 20' comprising a motorized lampchanger LC1' driven by a dc motor M1' and fitted with two 80 volt 500 watt (nominal) ac lamps L1, L2. Each station also includes a lower lantern assembly 22' comprising a motorized lampchanger LC2' driven by a dc motor M2' and fitted with one 80 volt 500 watt (nominal) ac lamp L3 and one 12 volt, 3 amp dc (nominal) standby lamp L4. Each station is controlled by a programmed microcomputer 24' powered by a battery bank 26' and battery charger 28'. The microcomputer 24' controls the upper and lower lantern assemblies 20', 22' as previously described in connection with system 10 in FIG. 1. All microcomputers are interconnected in an RS422 loop formed by RS422 busses 30', 32', 34' so as to operate all stations in synchronism in the "15mile", "12 mile standby" and "10 mile standby" modes in the manner described in connection with system 10 in FIG. 1.

Figure 3:
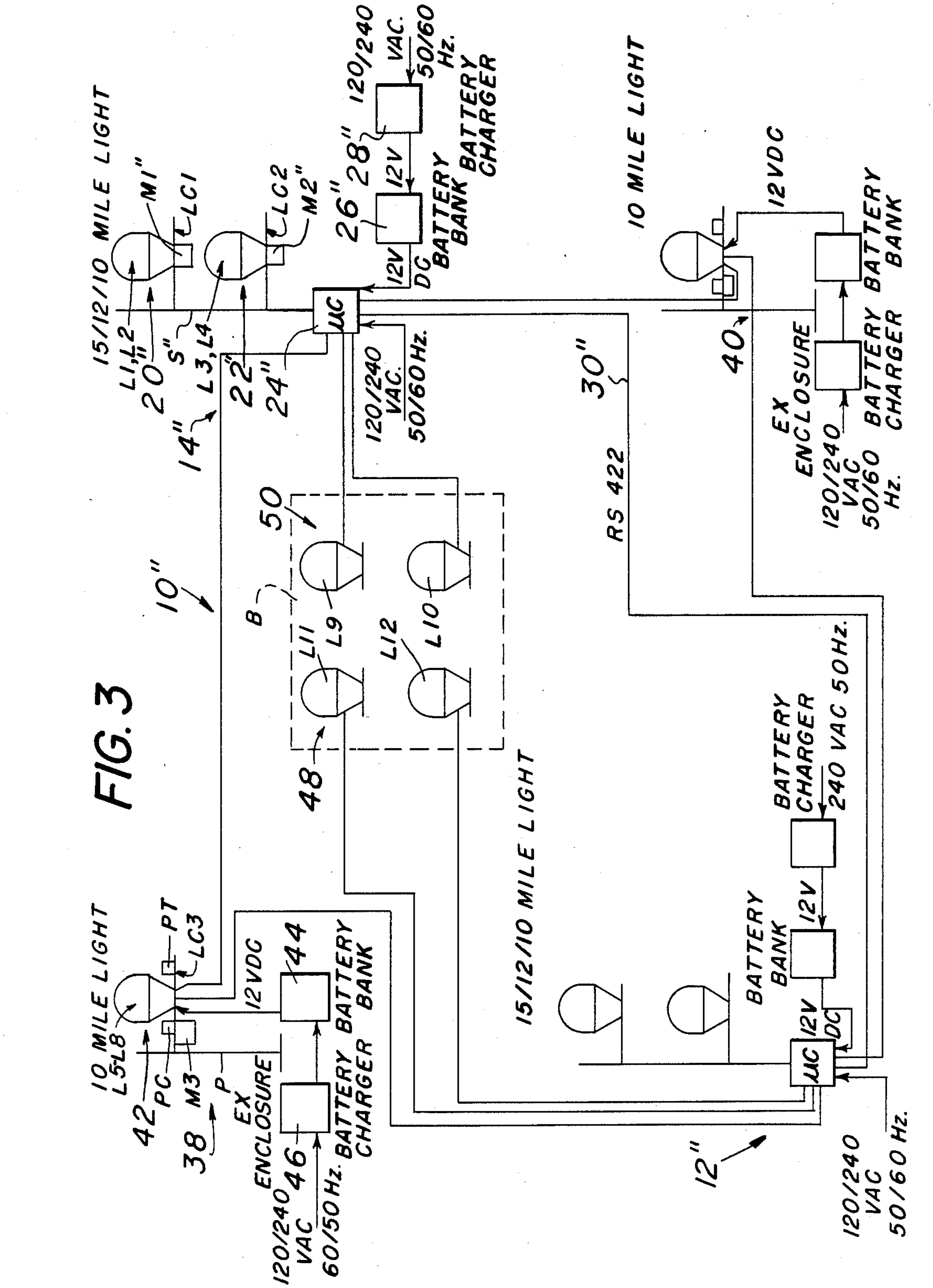
FIG. 3 is a block diagram of a "Dutch Waters" configuration of a marine navigation light system according to the present invention.

Although marine navigation light system requirements are not uniform throughout the world, the universal system 10 shown in FIG. 1 is capable of meeting all international requirements. The system may, however, be simplified, with attendant cost savings in equipment and installation, while still meeting the minimum requirements of a particular country. For example, "Dutch Waters" minimum requirements for a four corner platform include two stations at diagonally opposed platform corners capable of operation in a "15 mile" mode and a "10 mile standby" mode and two stations at the remaining two diagonally opposed platform corners capable of operation in a "10 mile" mode. A simplified system 10'' configured to meet "Dutch Waters" requirements is shown in FIG. 3 wherein like elements in FIGS. 1 and 3 are designated by double primed numerals. Identical microcomputer controlled stations 12'', 14'' capable of "15 mile", "12 mile standby" and "10 mile standby" mode operation (as previously described) are located at diagonally opposed corners of the platform. Station 14'' in FIG. 3 is identical to station 14 in FIG. 1. In the simplified system 10'', there are only two microcomputers and they are interconnected by a single RS422 buss 30''. Identical "10 mile" stations 38, 40 which do not contain microcomputer controls are located at the remaining two diagonally opposed corners of the platform. Stations 38, 40 being identical, description of station 38 will suffice. Station 38 includes a single FA250-EX lantern assembly 42 comprising a four place APL1297 lampchanger LC3 driven by a dc motor M3 and fitted with four 12 volt, 3 amp (nominal) dc lamps L5–L8. Lampchanger LC3 is powered by a 12 volt dc nickel cadmium battery bank 44 capable of 96 hour operation and coupled to a 12 volt dc battery charger 46 which is operated off the main ac line. The battery bank 44 and battery charger 46 are mounted in an EX enclosure. The lantern assembly 42 and the EX enclosure are mounted on a stanchion P at the platform corner. Both microcomputers at stations 12'', 14'' are connected to each lantern assembly at stations 38, 40 so that one or the other microcomputer drives a dc lamp L5, L6, L7 or L8 at a station 38, 40 at any instant of time thereby ensuring continuous operation of stations 38, 40 should either microcomputer fail. The microcomputers, however, do not control the lampchangers at stations 38, 40. In addition, each microcomputer operates an associated FA250-EX lantern assembly 48, 50, each such assembly being fitted with two pairs of "steady burn" lamps L9, L10 and L11, L12. Lantern assemblies 48, 50 are mounted on a centrally located platform bridge B in accordance with "Dutch Waters" requirements, and each steady burn lamp produces a light of at least 200 cd.

Stations 12'', 14'' operate in "15 mile", "12 mile standby" and "10 mile standby" modes in a manner identical to that of station 14 in FIG. 1. In addition, the microcomputer at each station 12'', 14'' monitors the dc lamps L5–L8 at each station 38, 40 to verify that the lamp at the lantern assembly focal position is flashing in the required manner in response to the microcomputer commands. Thus, the lantern assembly 42 at each station 38, 40 is provided with a photocell PC directed at the dc lamp L5, L6, L7 or L8 in the focal position of the lantern assembly. The photocell output is monitored by the microcomputers at stations 12'', 14''. If the photocell output indicates that the dc lamp at station 38 or 40 has not flashed, although commanded to do so by the microcomputer, the microcomputer permits lampchanger LC3 to position one of the three other or reserve lamps at the focal position of the lantern assembly. Lampchanger LC3 moves a reserve lamp to the focal position without command from either microcomputer. Thus, the lantern assembly 42 at station 38 is provided with an optical detector such as a phototransistor PT which detects failure of a lamp at the focal position and provides a signal to the lampchanger motor M3 whereby the lampchanger rotates the reserve lamp to the focal position. If the photocell PC indicates that the reserve lamp has not flashed after it has been commanded to do so by the microcomputer, the microcomputer permits the lampchanger to position another reserve lamp at the focal position of the lantern assembly. This sequence is repeated until a reserve lamp flashes in response to the microcomputer command and the flash is detected by the photocell so as to verify correct operation of the lamp. If no reserve lamps flash in response to the microcomputer command, the photocell PC indicating the same for each reserve lamp, then the microcomputer generates an alarm output signal.

Figure 4:
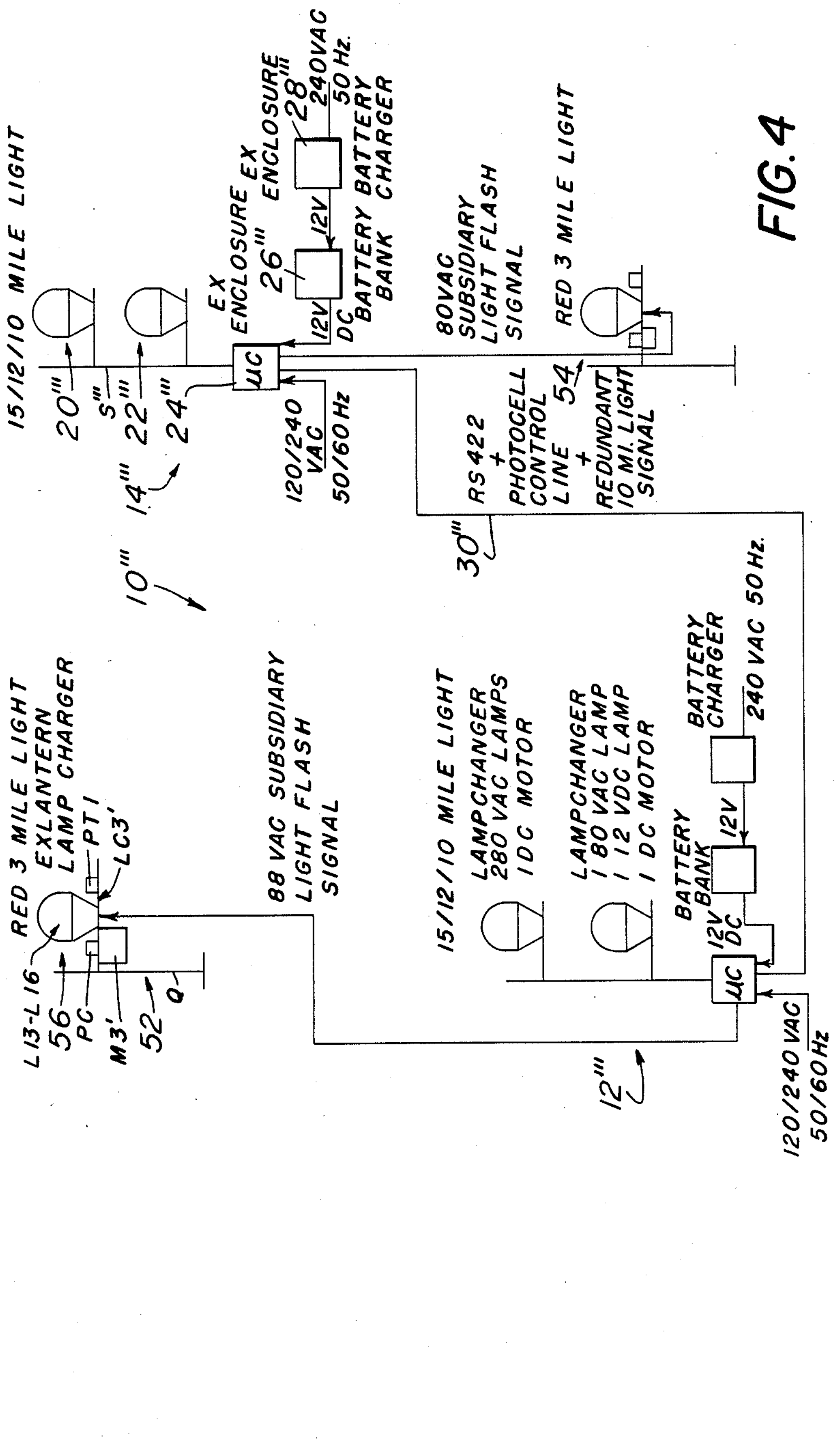
FIG. 4 is a "North Seas" configuration of a marine navigation light system according to the present invention.

A simplified system 10''' configured to meet "North Seas" requirements is shown in FIG. 4 wherein like elements in FIGS. 3 and 4 are designated by triple prime numerals. "North Seas" minimum requirements for a four corner platform include two stations at diagonally opposed platform corners capable of operation in a "15 mile" mode and a "10 mile standby" mode and two stations at the remaining two diagonally opposed platform corners capable of operation in a "3 mile" mode. In the simplified system 10''' shown in FIG. 4, identical microcomputer controlled stations 12''', 14''' capable of "15 mile", "12 mile standby" and "10 mile standby" mode operation (as previously described) are located at diagonally opposed corners of the platform. Station 14''' in FIG. 4 is identical to station 14 in FIG. 1. As in the "Dutch Waters" configuration shown in FIG. 3, there are only two microcomputers and they are interconnected by a single RS422 buss 30'''. Identical "3 mile" stations 52, 54 are positioned at the remaining diagonally opposed corners of the platform. Stations 52, 54 being identical, description of station 52 will suffice. Station 52 includes a FA250-EX lantern assembly 56 comprising an APL 1297 four place lampchanger LC3' driven by a dc motor M3' and fitted with four red lamps L13–L16. Lantern assembly 56 is mounted on a stanchion Q at the platform corner. Lampchanger LC3' is powered by a 12 volt dc nickel cadmium battery bank coupled to a 12 volt dc battery charger operated off the main ac line. The battery bank and battery charger are mounted in an EX enclosure mounted on the stanchion Q. Operation of station 14''' in the "15 mile", "12 mile standby" and "10 mile standby" modes is identical to that of station 14 in FIG. 1. In addition, microcomputer 24''' monitors a photocell PC' located at the focal position of the lantern assembly at one of stations 52, 54 to verify that the red lamp has flashed in response to a command from the microcomputer. If the lamp has not flashed in response to the microcomputer command, the microcomputer permits the lampchanger LC3' to cycle through all reserve lamps, in the manner previously explained in connection with lampchanger LC3 in FIG. 3. If no reserve lamps flash in response to the microcomputer commands, as indicated by the photocell, the microcomputer generates an alarm output signal.

Figure 5:
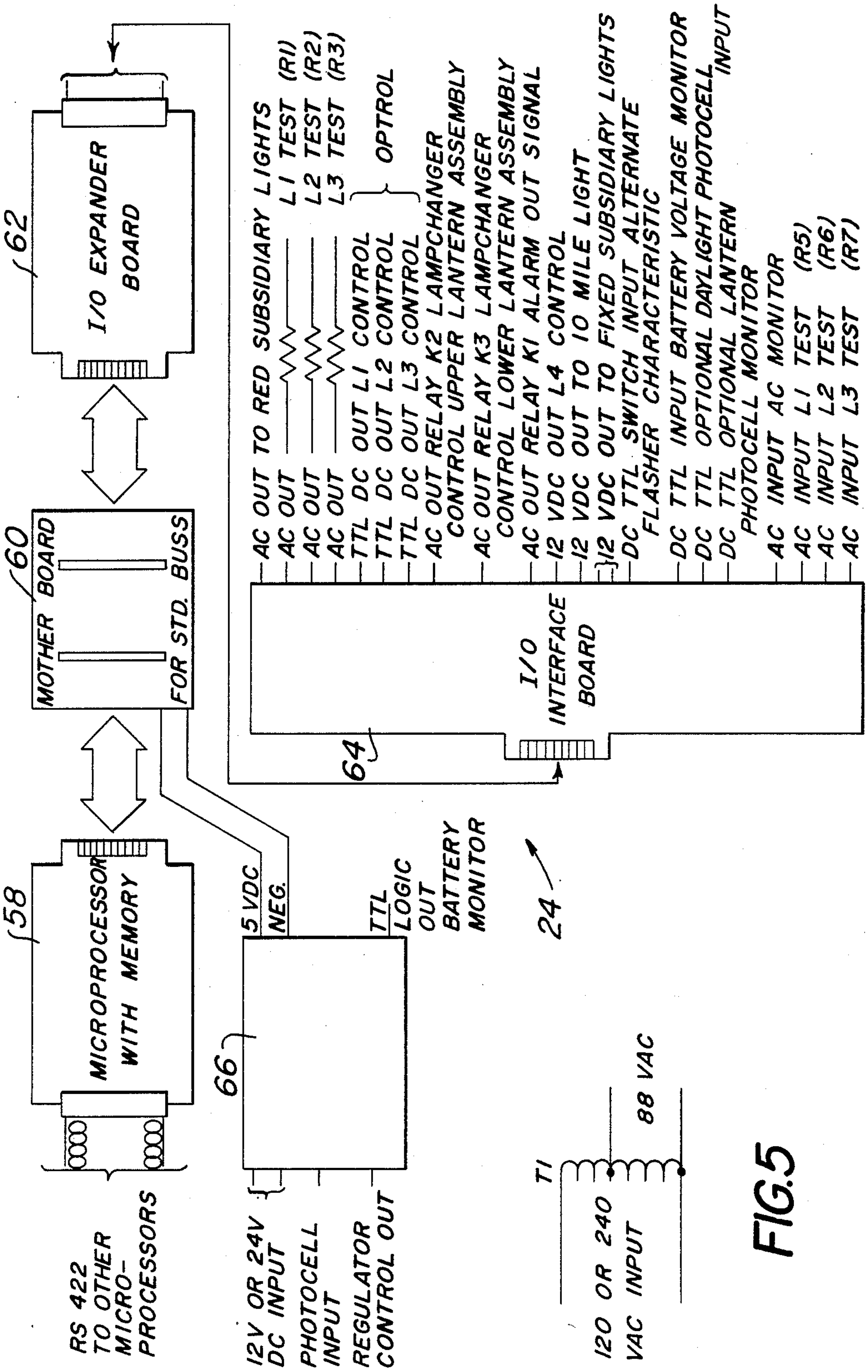
FIG. 5 is a layout of printed circuit boards utilized in constructing a microcomputer controlled lamp station in accordance with the present invention.

The preferred architecture for the hardware for any microcomputer 24, at each station 12, 14, 16, 18 in FIG. 1, is shown in FIG. 5. The architecture includes a NP 19 printed circuit board 58 connected to a RS422 buss. The board 58 is provided with a TI9995 16 bit microprocessor integrated circuit including RAM and ROM memory. Board 58 mates with a standard mother board and buss 60. A NP47 I/O expander board 62 provided with I/O interface circuitry (described hereafter) communicates with the microprocessor board 58 via the standard buss. A PB24Q I/O interface board 64 provided with additional I/O interface circuitry mates with the I/O expander board 62. The I/O interface board 64 is provided with conventional I/O circuit modules to provide each of the outputs designated in FIG. 5 as discussed more fully below. A power supply 66 provides a 5 volt dc output which is distributed to boards 58, 62 and 64 via the mother board 60 to power all logic circuitry. The power supply also provides a TTL "battery voltage monitor" output which is connected to an input of the I/O interface board 64. AC input to the I/O interface board 64 is 88 volts ac provided by an autotransformer T1 connected at its primary to the main ac line. The architecture shown in FIG. 5 constitutes a universal microcomputer configuration having inputs and outputs which may be connected as the user desires so as to operate in any one of the configurations shown in FIGS. 1–4.

Referring to FIGS. 6A–6D, there is shown a detailed block diagram of the hardware which is mounted on the boards shown in FIG. 5. The power supply 66 includes a voltage regulator 68 and a low power sense circuit 70. See FIG. 6A. Circuit 70 generates the "battery voltage monitor" signal which indicates the level of the nominal 12 volts dc output of battery bank 26 at a microprocessor controlled station 12, 14, 16, 18. The output signal is passed through I/O module 72 to the microprocessor 74 via board connectors 76, 78, parallel input circuit 80, I/O decode circuit 82 and the standard mother board buss 60. I/O module 72 is a bank of opto-isolators, each connected between a TTL input line and one of the TTL lines at connector 76. I/O decode circuit 82 is a pair of SN74LS42 four-to-ten line decoders, one being connected between buss 60 and the input lines to parallel output circuit 88 and the other being connected between buss 60 and the output lines of parallel input circuit 80. Parallel input circuit 80 is a 74LS251 three-to-eight line decoder with latched outputs. The microprocessor 74 determines whether the "battery voltage monitor" signal has dropped below a preselected threshold stored in memory 84. Normally, the "battery voltage monitor" signal is above the threshold and the microprocessor generates a TTL command signal which commands I/O module 86, via buss 60, I/O decode circuit 82, parallel output circuit 88 and board connectors 90, 76, to generate an ac output signal which keeps alarm relay K1 open. I/O module 86 may be an OAC5Q quad ac output module manufactured by Opto 22. If the "battery voltage monitor" signal drops below the threshold, the microprocessor stops generating the TTL command signal whereby I/O module 86 removes the ac output signal to relay K1. This de-activates the relay so that the relay closes to generate an alarm output signal which triggers an alarm which may for example be located at a central control and alarm box.

In a preferred embodiment of the system, a daylight photocell 92 is mounted at each microprocessor controlled station 12, 14, 16, 18 and pointed towards the northern sky. See FIG. 6A. The photocells for all stations are interconnected at their outputs through a diode OR interlock circuit whose output is fed to an enable/disable input of the regulator 68 at each station. Under daylight conditions, the interlock circuit output disables the regulator 68 whereby dc power (+5 v) is removed from the buss 60. Accordingly, the system does not consume power during daylight conditions. If any one of the photocells indicates night time conditions, however, the interlock circuit output enables the regulator at each station to supply dc power to the station.

If desired, the daylight photocell 92 may be connected instead to the "daylight photocell" input line to I/O module 72. The microprocessor 74 senses the state of the "daylight photocell" input signal which indicates daylight or night time conditions. If daylight conditions are detected at all microcomputer controlled stations 12, 14, 16, 18, the microprocessor 74 shuts down and does not produce any ac output signals at I/O modules 86, 94 or any dc output signals at I/O module 108. Accordingly, none of the lamps L1–L4 are operated. Thus, by connecting the daylight photocell 92 to the "daylight photocell" input of I/O module 72, only negligible power is drawn by the microcomputer during daylight conditions. If a photocell at any microcomputer controlled station indicates night time conditions, however, the microprocessor 74 at each station generates the ac and dc output signals at I/O modules 86, 94 and 108 which are required to operate the lamps L1–L4.

The microprocessor controlled stations of the present invention permit virtually continuous monitoring of the upper and lower lantern assembly ac lamps L1, L2 and L3. As described in greater detail hereafter, the microprocessor periodically enables an I/O module 94 to generate 88 volt ac signals on output lines (labeled "Test Outputs" in FIG. 6D) connected to the filaments of ac lamps L1, L2, L3. I/O module 94 is an OAC5Q quad ac output module manufactured by Opto 22. The outputs of I/O module 94 are connected via dropping resistors R1–R3 to the lamp filaments. The module is connected to the 88 volt ac output of autotransformer T1. If a lamp L1, L2, L3 is working, i.e., not burned out, then the voltage at the associated junction point J1, J2, J3 drops to approximately 8 volts ac (nominal). The junction points are connected via dropping resistors R5–R7 to the "Test Inputs" lines at I/O module 96. I/O module 96 is a IDC5Q ac/dc input module manufactured by Opto 22. The outputs of the module are fed through board connectors 76, 78, parallel input circuit 80, I/O decode circuit 82 and buss 60 to the microprocessor 74. When a junction point J1, J2 or J3 is at low voltage (nominal 8 volts ac), the microprocessor senses a low TTL voltage at a corresponding output of module 96, indicating that the filament of the corresponding lamp L1, L2 or L3 is working. If a filament has burned out, however, the associated junction point, J1, J2 or J3, will be at a high ac voltage which is reflected at one of the "Test Inputs" lines to module 96. The corresponding TTL voltage output of module 96 changes accordingly and is sensed by microprocessor 74 thereby indicating that the filament of lamp L1, L2 or L3 has burned out. In response, the microprocessor produces a TTL command signal at the input to I/O module 86 so as to control the appropriate lampchanger LC1 or LC2 via one of the relays K2, K3.

The I/O module 96 also monitors the main ac line via a dropping resistor R4. See FIG. 6D. If main ac power is lost, the resistor R4 input to module 96 drops, microprocessor 74 senses the condition at a corresponding output of the module and the microprocessor operates I/O module 86 to de-activate relay K1 and thereby generate an alarm output signal.

As indicated above, the upper and lower lantern assembly lampchangers LC1, LC2 are controlled respectively by relays K2, K3 which are connected to outputs of I/O module 86. I/O module 86 produces ac outputs which control each of the relays K1–K3. Normally, all relays K1–K3 are energized or activated by the module 86 outputs. When relay K1 is activated, it maintains an alarm in the off condition. When the relay is deactivated, it generates the alarm output signal to trigger the alarm. When relays K2, K3 are activated, the lampchanger motors M1, M2 maintain the lampchangers in their "primary" positions wherein, for example, lamp L1 is at the focal point of upper lantern assembly 20 and lamp L3 is at the focal position of lower lantern assembly 22. When either of relays K2, K3 is de-activated, it generates a signal which causes the associated lampchanger motor M1 or M2 to rotate to the "secondary" position wherein, for example, ac lamp L2 is moved to the focal position of upper lantern assembly 20 and dc standby lamp L4 is moved to the focal position of lower lantern assembly 22.

Each of the ac lamps L1, L2, L3 is flashed during normal operation in the "15 mile" or "12 mile standby" modes to produce the desired Morse code pattern by solid state relays 98, 100, 102, each of which receive the 88 volt ac output signal from autotransformer T1. Solid state relays 98, 100, 102 may be Optrol relays. Each relay passes or blocks the 88 volt ac signal from the autotransformer to junction J1, J2 or J3 based on a TTL output from I/O module 104. I/O module 104 is a direct TTL connection between connector 76 and the dc inputs of optrols 98, 100, 102. During normal operation, an ac lamp L1, L2 or L3 is flashed on and off in response to a module 104 TTL output signal for example as shown in FIG. 9. This pattern produces the nominal one second on, one second off, one second on, one second off, three seconds on and eight seconds off visible flash pattern for a Morse code "U". Other patterns may also be employed, to designate any other letter, as will be evident from the ensuing description of operation of the system.

The outputs of I/O module 108 control the flash patterns of dc standby lamp L4 in lower lantern assembly 22 and the dc lamps L5–L8 at the "10 mile" stations 38, 40 in the "Dutch Waters" configuration shown in FIG. 3. Module 108 is an ODC5Q quad dc output module manufactured by Opto 22 having TTL inputs and +12 volt dc level outputs. Of course, if a configuration such as that shown in FIGS. 1 and 2 is employed, so that there are no "10 mile" lamps L5–L8 as in the "Dutch Waters" configuration of FIG. 3, then the "10 mile light" output of module 108 is not utilized. Similarly, module 108 has a pair of outputs which drive the fixed or steady burn lamps 48, 50 at the platform bridge in the "Dutch Waters" configuration as shown in FIG. 3, and the outputs would not be utilized for a configuration which does not employ bridge lights 48, 50. The module 108 output, which drive the "10 mile" lamps L5–L8 in the "Dutch Waters" configuration shown in FIG. 3 are normally the same as the drive signals shown in FIG. 9 but the on and off times A–F are reduced by approximately 0.25 seconds due to dc lamp characteristics. The module 108 outputs which drive the steady burn lamps 48, 50 are steady dc signals which do not vary.

If desired, the drive signal (on/off) pattern shown in FIG. 9 can be altered based on a switch input to I/O module 72 labeled "Alternate Flash Characteristic". Thus, the on and off times A–F for the lamp drive signals during normal operation may be assigned alternate values which are stored in different block locations in the ROM portion of memory 84. A character stored in memory indicates which block of ROM memory is to be accessed and temporarily stored in the RAM portion of the memory to generate the drive signals. The on/off times for the drive signals in these memory blocks may be different in sequence and duration, so as to create different on/off flash patterns and Morse code letters depending on the state of the character. The character is set based on the state of the "Alternate Flash Characteristic" signal input to module 72.

Under certain conditions, described in detail hereafter, it is desirable to operate the dc lamps L4, as well as the "10 mile" dc lamps L5–L8 at stations 38, 40 for the "Dutch Waters" configuration in FIG. 3, in a "default" flash pattern. Under such circumstances, the microprocessor 74 operates module 108 to produce drive signals at the module output lines which control lamp L4 and the "10 mile" lamps of the "Dutch Waters" configuration (if any) in the pattern shown in FIG. 10. The on and off times G–L for the "default" drive pattern are stored in another block of the ROM portion of memory 84 and are accessed by microprocessor 74 when particular conditions, described hereafter, are sensed by the microprocessor.

For the "Dutch Waters" configuration shown in FIG. 3, the lantern assembly for each "10 mile" station 38, 40 is provided with a photocell PC trained on the focal position of the lantern assembly. The photocell output is sensed at the "lantern photocell monitor" input to module 72 at one of the microcomputer controlled stations 12", 14" in FIG. 3. The microprocessor 74 de-activates relay K1 via I/O module 86 to generate an alarm output signal if the photocell indicates that the "10 mile" dc lamp L5, L6, L7 or L8 has not flashed when it has been commanded to do so by the microcomputer.

The microprocessor board 58 (FIGS. 6A and 6B) includes a firmware decode ROM 110 connected to the microprocessor 74, memory 84 and buss 60. The memory 84 includes a ROM portion which contains the microprocessor program and a RAM portion in which data is stored and utilized by the microprocessor during operation. The program is described hereafter by reference to the detailed flow chart shown in FIG. 7A–7I. The firmware decode ROM is a TBP28S42 chip which is pre-programmed to decode memory and input-output data. A power up reset circuit 112 is connected to the microprocessor 74. The power up reset circuit 112 is a LM3905 chip. The microprocessor 74 communicates with the other microcomputers in the RS422 loop through a I/O decode circuit 114 which is a universal asynchronous receiver-transmitter (UART) in the form of a TMS9902 chip. The I/O decode circuit is coupled to the RS422 lines by serial I/O circuits 116, 118, each of which is a SN75151 driver chip.

Figure 7A:
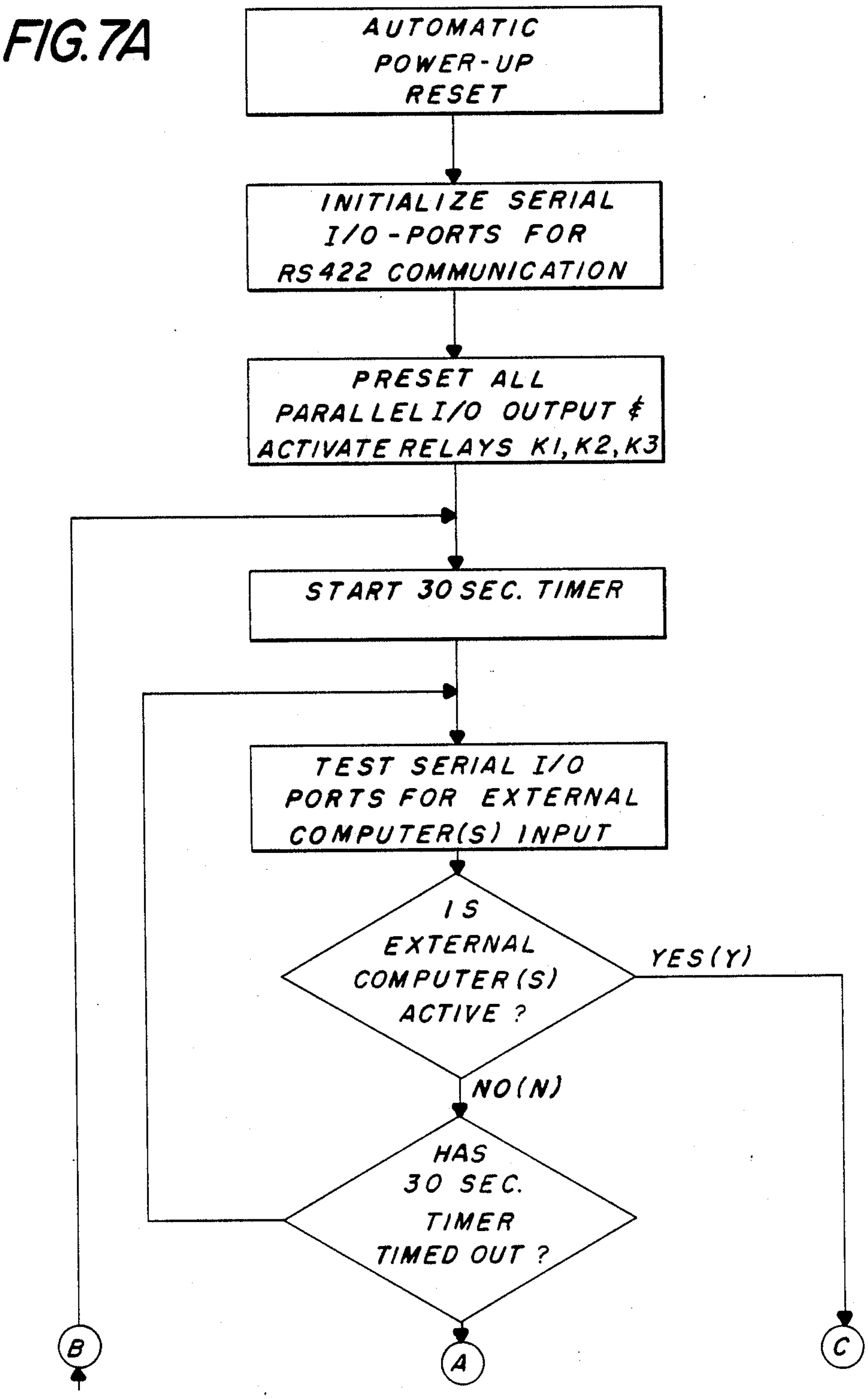
FIGS. 7A–7I form a flow chart showing programmed operation of a microcomputer at a microcomputer lamp station in accordance with the present invention.
Figure 7B:
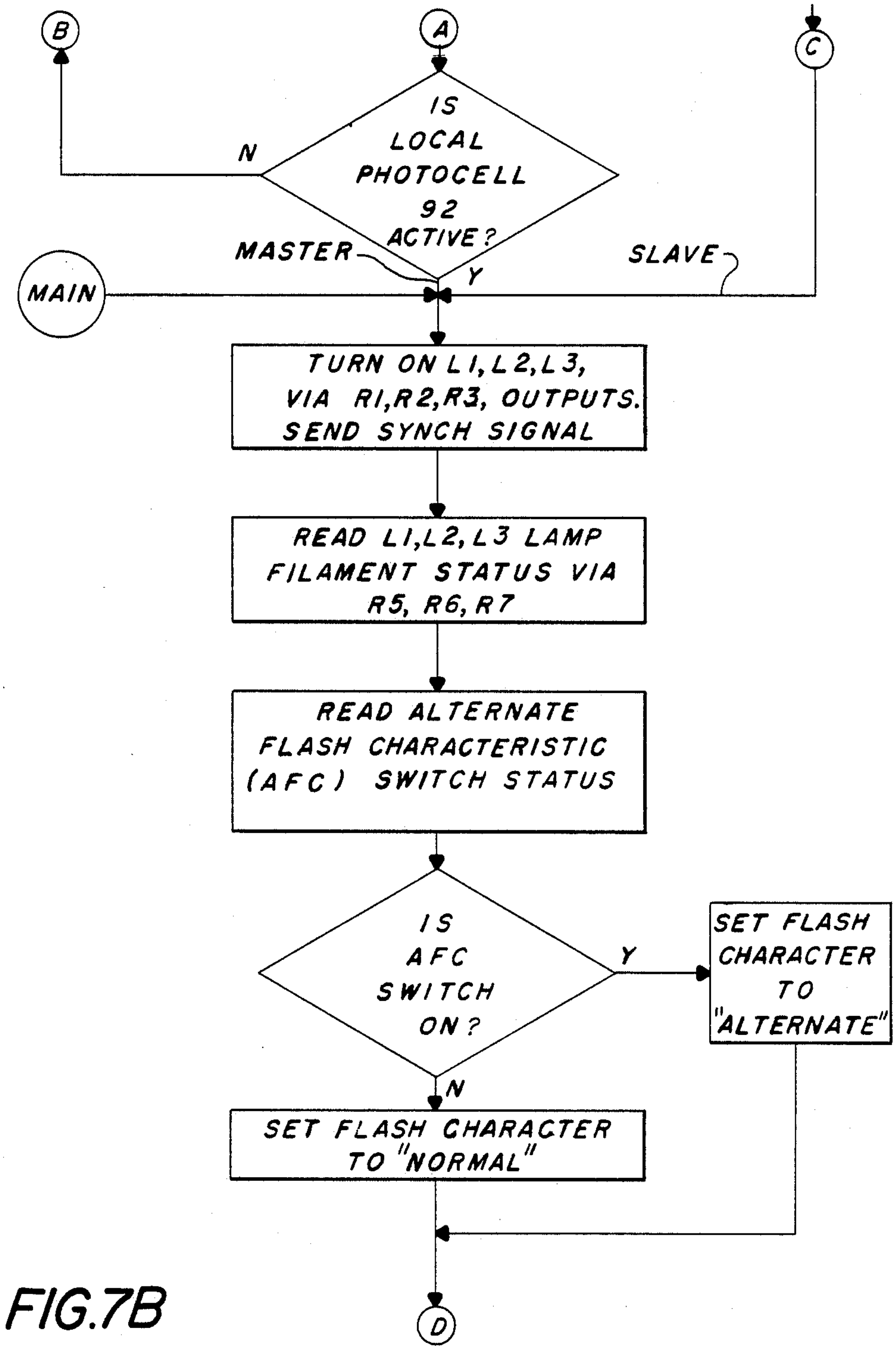
Figure 7C:
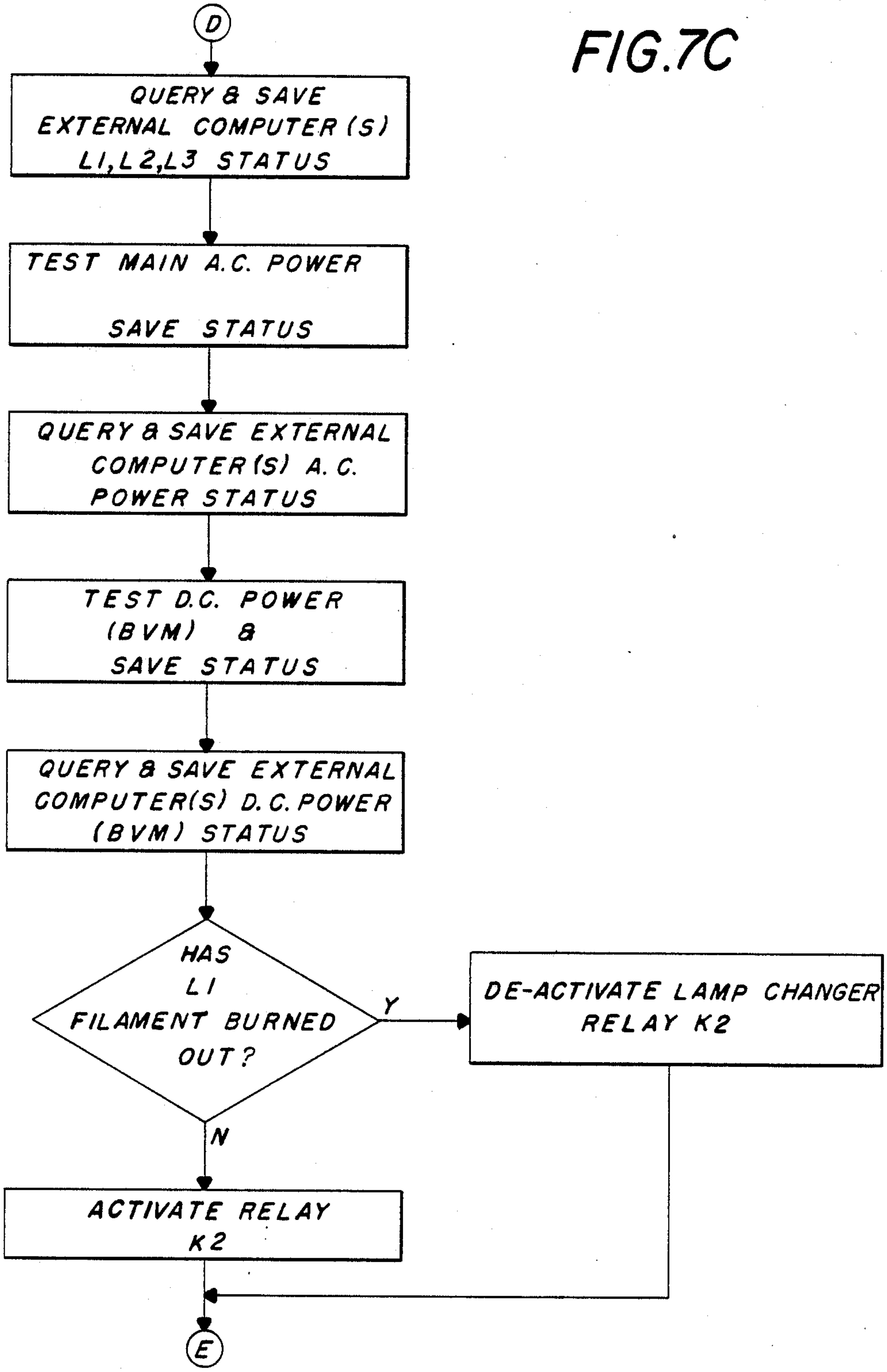
Figure 7D:
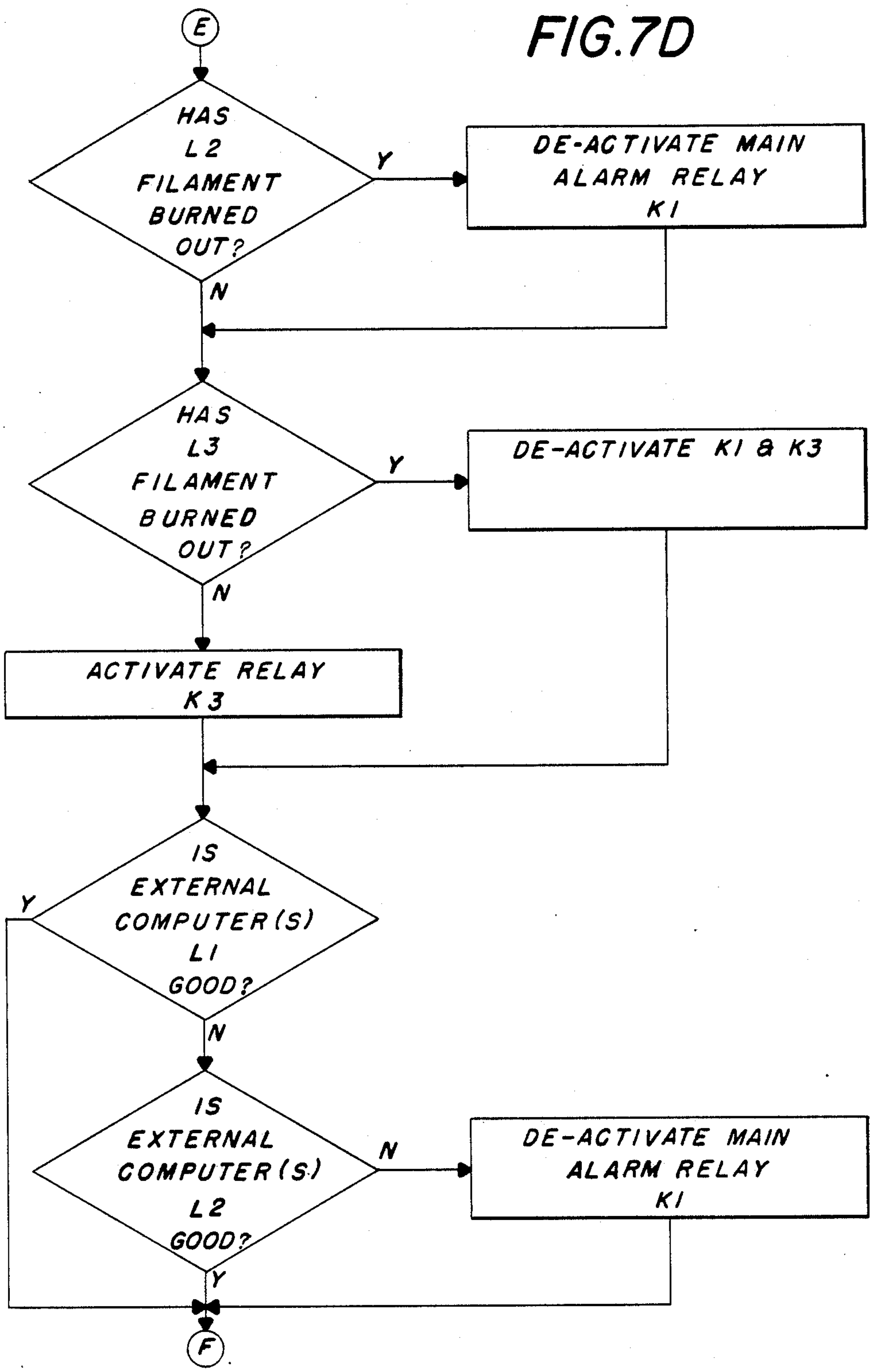
Figure 7E:
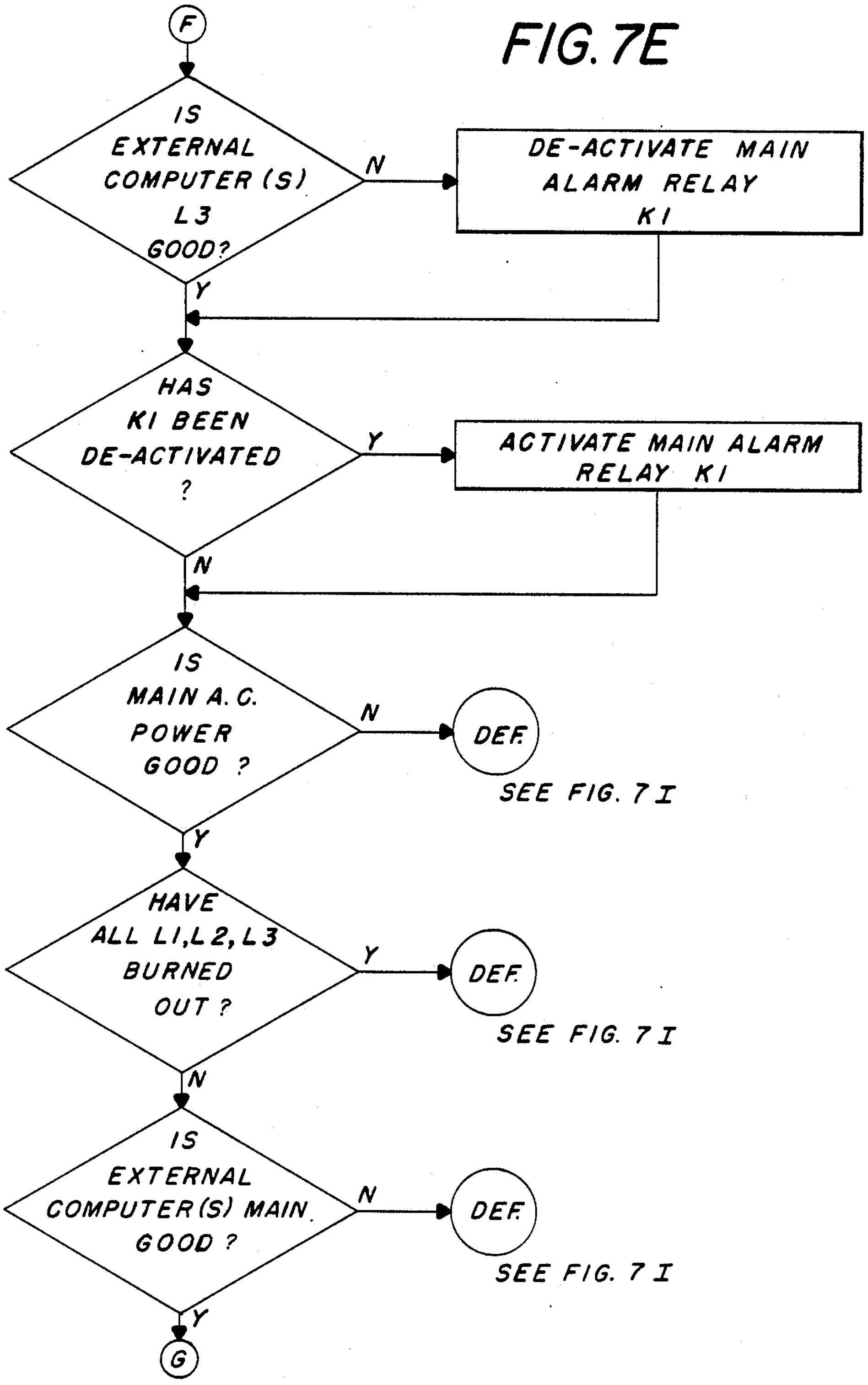
Figure 7F:
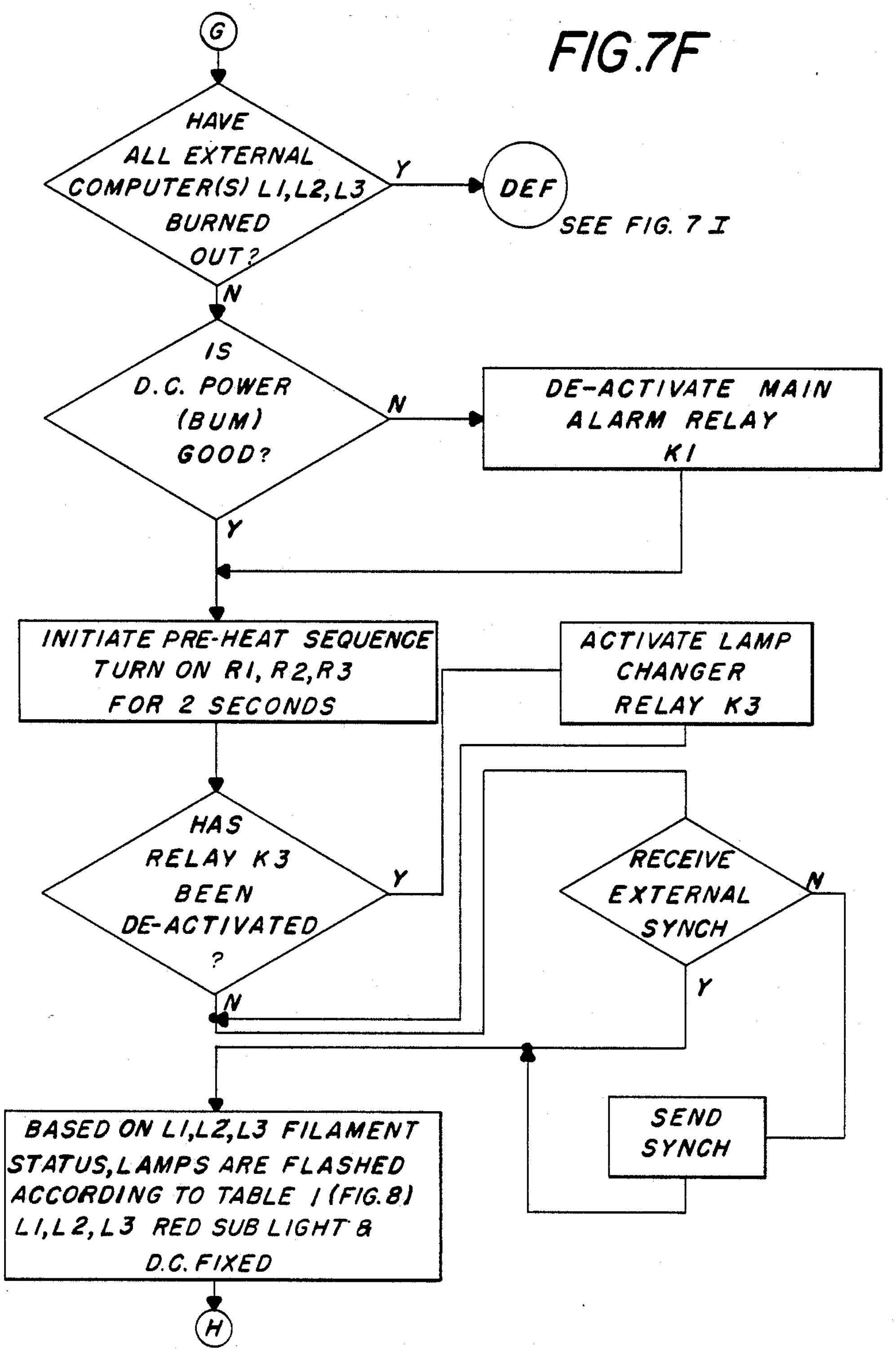
Figure 7G:
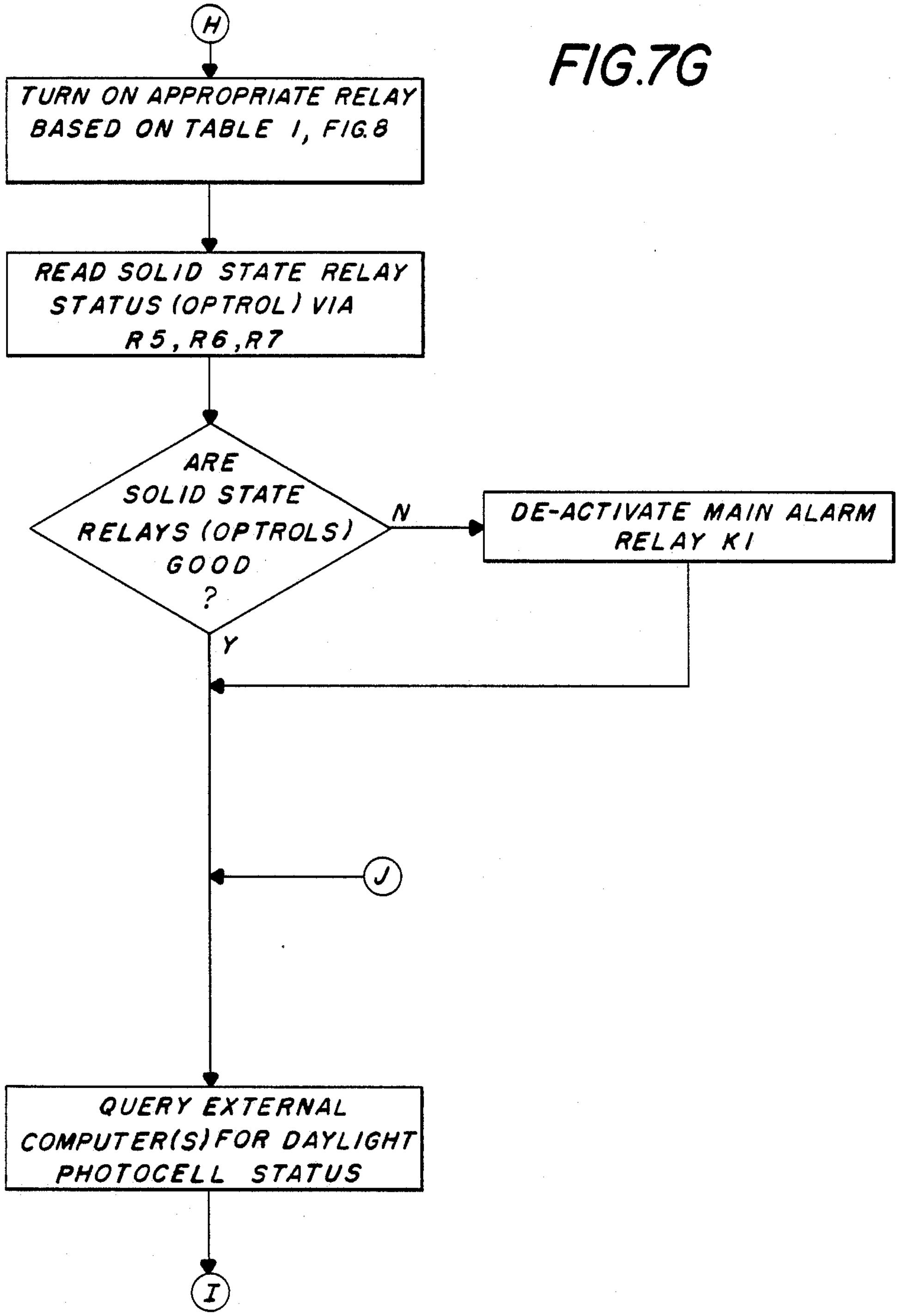
Figure 7H:
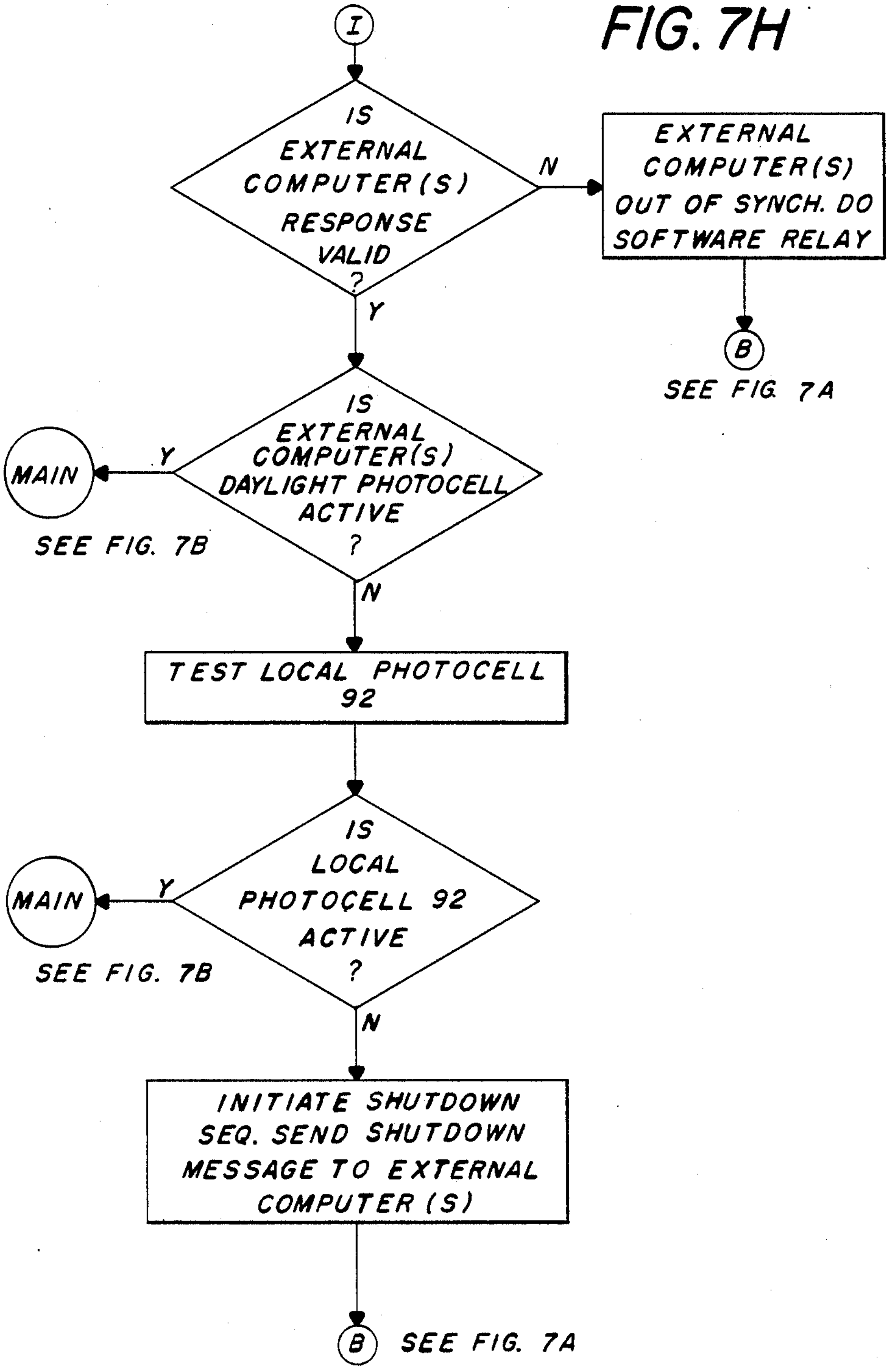
Figures 7I, 8:
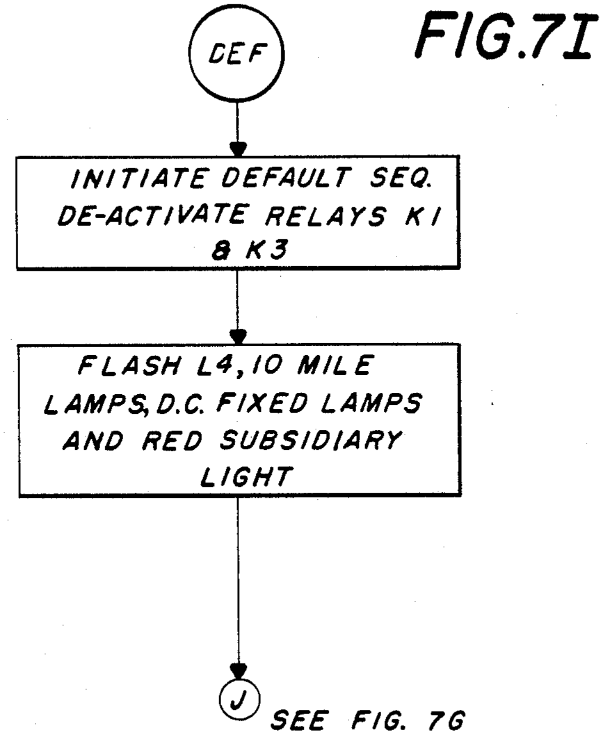
FIG. 8 is a logic table stored in microcomputer memory and utilized to control the ac lamps and dc standby lamps in accordance with the present invention.

The program for operation of a microprocessor 74 for any microcomputer controlled station 12, 14, 16, 18 is represented in the flow chart of FIGS. 7A–7I and the table shown in FIG. 8. In accordance with this program, the microcomputer at any station 12, 14, 16, 18 controls the station in the "15 mile" and "12 mile standby" modes and in the "10 mile standby" or "default" mode previously described. If the microcomputer is connected in the simplified "Dutch Waters" configuration shown in FIG. 3, it will also control the "10 mile" lamp stations 38, 40 (which are not provided with their own microcomputers) as previously described. And if the microcomputer is connected in the "North Seas" configuration shown in FIG. 4, it will control the "3 mile" lamp stations 52, 54 (also which are not provided with their own microcomputers) as previously described. Thus, the microcomputer at any station 12, 14, 16, 18 is programmed for operation in a variety of control configurations which are implemented simply by making the proper connections between the I/O modules and system elements.

For example, in the "Dutch Waters" configuration shown in FIG. 3, the microcomputer will generate the "red subsidiary light" output signal (FIG. 6D) as described hereafter but since no "3 mile" red subsidiary light is utilized in the "Dutch Waters" configuration, the signal output will be disconnected. Similarly, in the "North Seas" configuration shown in FIG. 4, the microcomputer generates the "10 mile" light and "fixed light" output signals (FIG. 6D) as described hereafter but since the "North Seas" configuration does not utilize "10 mile" lamps or steady burn lamps these signal outputs will be disconnected. Any such output, however, may be connected to the appropriate controlled element to realize "Dutch Waters" or "North Seas" configurations as shown in FIGS. 3 and 4. Any microcomputer control station 12, 14, 16, 18, then, may be thought of as a fundamental building block, programmed to permit the user to realize any of the configurations shown in FIGS. 1–4 to satisfy any international marine navigation light system requirements.

Figure 6A:
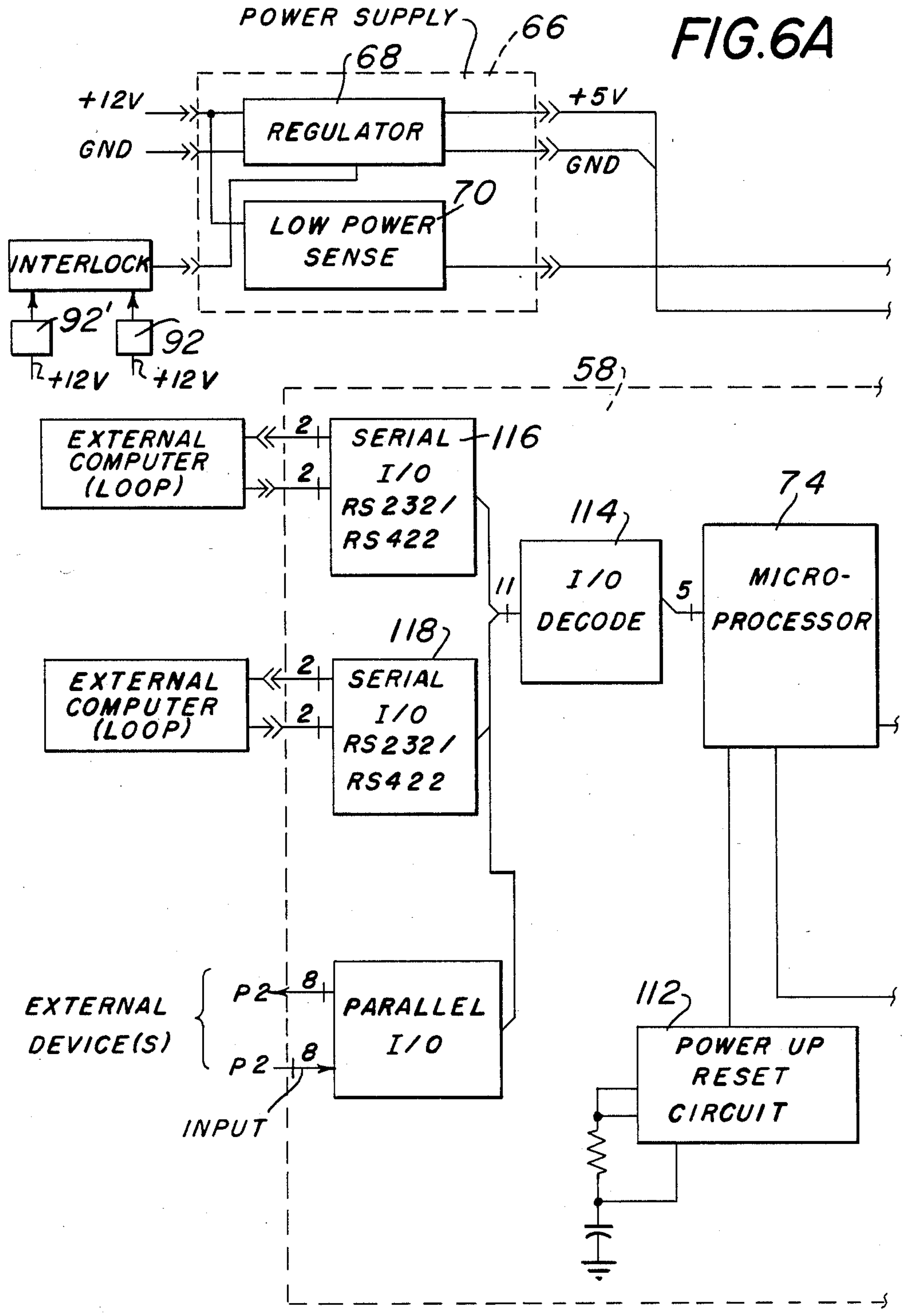
FIGS. 6A–6D form a block diagram of a microcomputer controlled lamp station in accordance with the present invention.
Figure 6B:
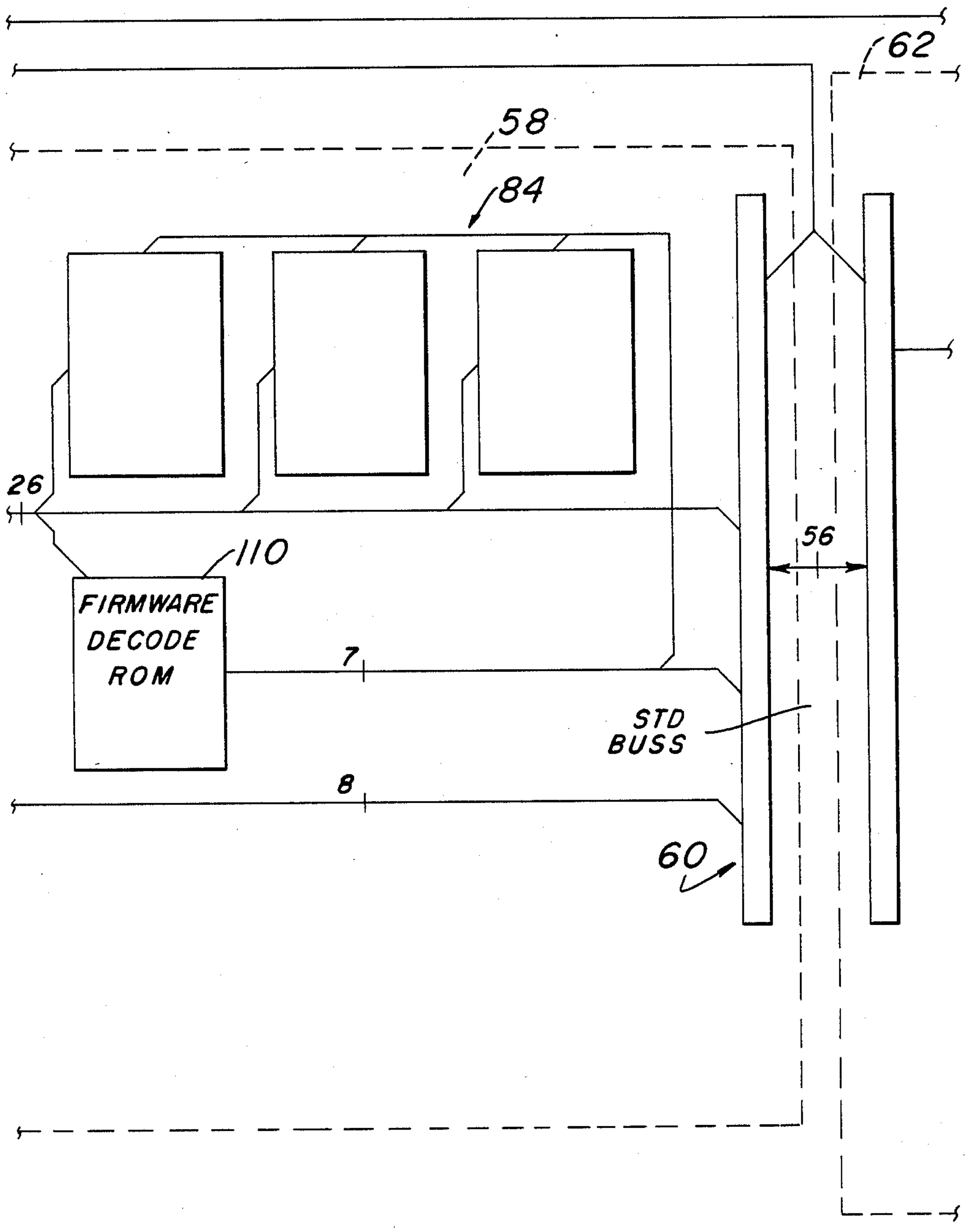
Figure 6C:
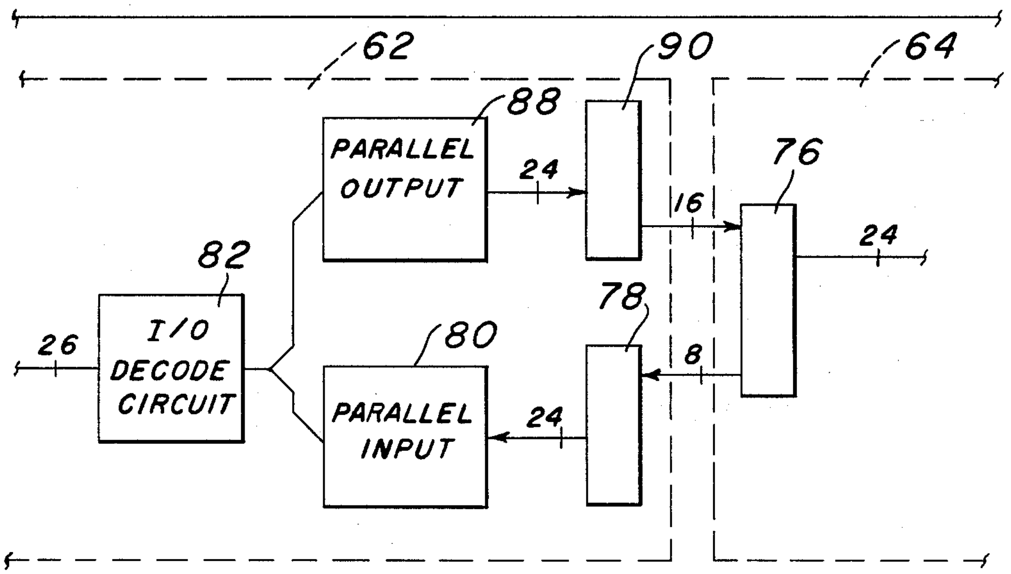
Figure 6D:
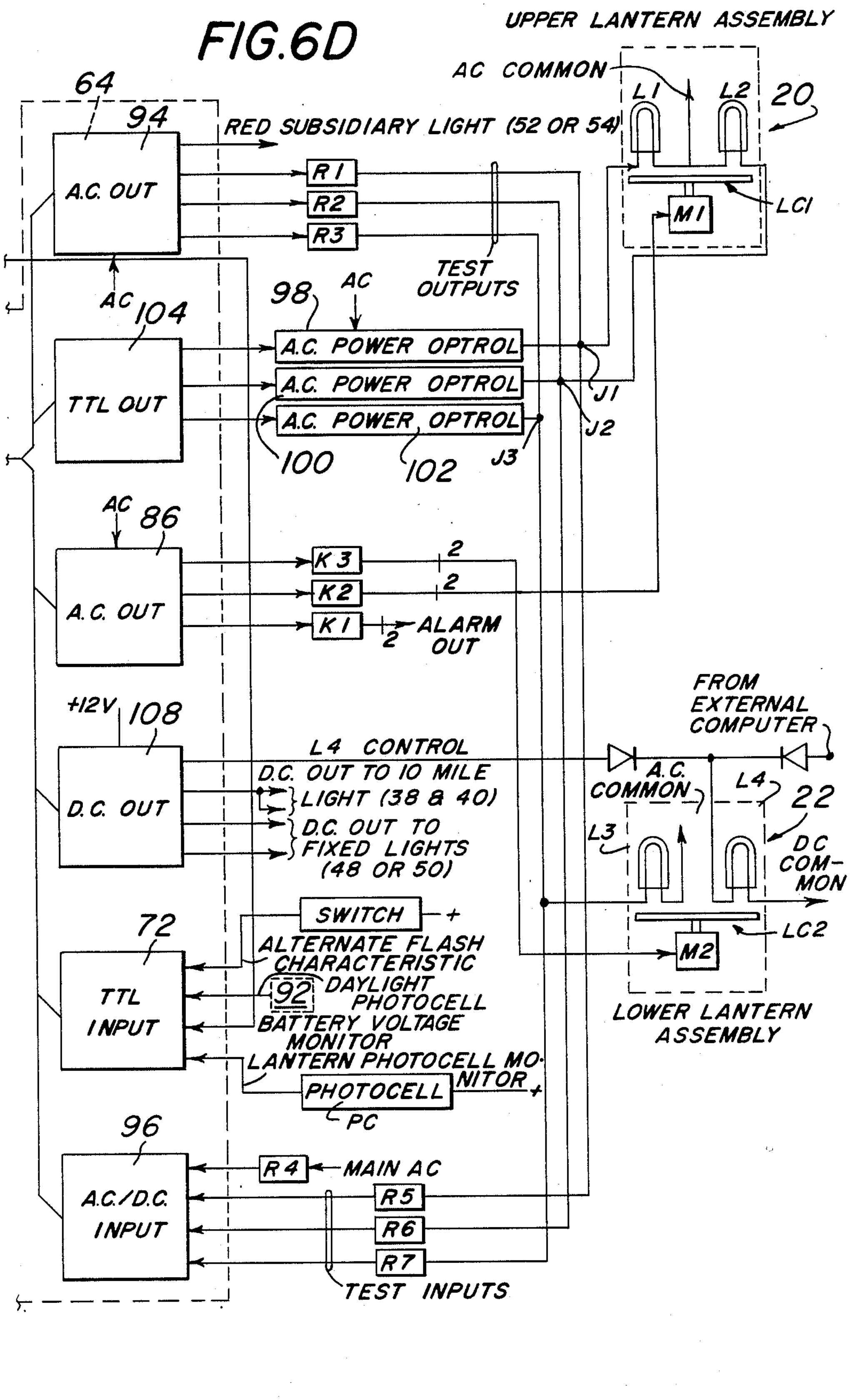

Referring to FIG. 7A, upon application of power the power up reset circuit 112 (FIG. 6A) initializes microprocessor 74 to the appropriate internal logic states to begin operation. The microprocessor also initializes the serial I/O circuits 116, 118 for RS422 communication. Since there are two serial I/O circuits 116, 118 the microprocessor has the ability to communicate with at least two other identical microcomputers in the RS422 loop. The number of serial I/O circuits can be increased to permit communication with more than two other microcomputers in a loop. Depending upon the particular system configuration, however, the microcomputer may be connected over an RS422 line to only one other microcomputer (as in the "Dutch Waters" and "North Seas" configurations shown in FIGS. 3 and 4). Accordingly, only one serial I/O circuit would be connected to the RS422 loop. On power of reset, the microprocessor also presets all I/O module outputs (FIG. 6D). The I/O module 86 outputs activate all relays K1–K3 so that no alarm output signal is produced by the relay K1 and so that relays K2 and K3 maintain the upper and lower lamp changers LC1, LC2 in their "primary" positions wherein ac lamps L1 and L3 are at the focal positions of their lantern assemblies. The microprocessor then enters a 30 second timer routine.

In the 30 second timer routine, the microprocessor attempts to synchronize its operations with the microprocessors at the other microcomputer controlled stations in the system. During operation, each microcomputer in the RS422 loop sends messages over the loop to the other microcomputers to indicate various conditions, namely, that the microcomputer is "active", i.e., that it has exited its 30 second timer routine and at least one daylight photocell in the loop indicates nighttime conditions, the status of the ac lamps L1, L2, L3 being controlled by the microcomputer, and whether the microcomputer has detected any loss in ac or dc power. First, the microprocessor tests the serial I/O circuits 116, 118 for a message from another ("external") microcomputer indicating that such microcomputer is "active". A microcomputer in the loop will generate such a message if it has exited its 30 second timer routine and the daylight photocell which it is monitoring (or any other daylight photocell in the loop) indicates nighttime conditions. If the microprocessor receives a message from an "active" microcomputer in the RS422 loop, the microprocessor assumes a "slave" role of operation wherein it proceeds to test the ac lamps L1, L2, L3, regardless of the condition of its own daylight photocell 92. In essence, in the "slave" role, the microcomputer synchronizes its operation to that of an "active" microcomputer in the loop. The microprocessor will wait for a "synchronizing" message (ASCII code) from the other (active) microcomputer which indicates that the latter microcomputer is entering the routine for testing its own ac lamps L1, L2, L3, and the microprocessor will then test its ac lamps L1, L2, L3 and proceed through one cycle of the program.

If no message is received from any microcomputer in the loop indicating that such microcomputer is "active", the microprocessor determines whether the 30 second timer has timed out. If the timer has not timed out, the microprocessor re-checks the serial I/O circuits for a message from another microcomputer indicating that such microcomputer is "active". If the 30 second timer has timed out, and no message has been received from another microcomputer indicating that such microcomputer is "active", then the microprocessor checks its own daylight photocell 92 (FIG. 6D). See FIG. 7B. If the photocell output indicates night time conditions, the microprocessor assumes a "master" role of operation in the RS422 loop, generates a "synchronizing" message (ASCII code) over the loop and tests its ac lamps L1, L2, L3 via the dropping resistor outputs R1, R2, R3 (FIG. 6D). If the photocell indicates daylight conditions, the microprocessor begins the 30 second timer routine again. Thus, the microprocessor continues to cycle repetitively through the 30 second timer routine until it detects that another microcomputer is "active" either in a "slave" or "master" role or that its own daylight photocell indicates nighttime conditions. The following description of the programmed operation of the microprocessor, referencing the portions of the flow chart appearing in FIGS. 7B–7I, applies whether the microprocessor is operating in the "master" role or the "slave" role.

In testing the ac lamps L1, L2, L3 (FIG. 7B), the microprocessor commands I/O module 94 (FIG. 6D) to transmit 88 volts ac to the lamps via dropping resistors R1, R2, R3. The voltage condition at each junctions J1–J3 is detected at I/O module 96 via dropping resistors R5, R6 or R7 and is transmitted as a TTL signal to the microprocessor. These TTL signals indicate the filament status for lamps L1, L2, L3. Signals representing the status of the lamp filaments are stored in memory for later use. The microprocessor then checks the status of the "alternate flash characteristic" switch at the input of I/O module 72. If the switch is "off", the microprocessor sets a character in memory to indicate "normal" flash operation wherein the stored waveform parameters A–F (FIG. 9) will be retrieved from ROM and utilized in generating the drive signal for the ac lamps. If the switch is "on", the microprocessor sets the character to indicate "alternate" flash operation wherein other stored parameters A–F, having other on and off time sequences and/or values, will be retrieved from ROM and used in generating the drive signals for the ac lamps.

Referring to FIG. 7C, the microprocessor then sends a query message over the RS422 loop. Each microcomputer in the loop will respond with messages indicating the status of its ac lamps L1, L2, L3. The messages are stored in memory by the microprocessor. The microprocessor then tests the main ac input at I/O module 96 via dropping resistor 94 (FIG. 6D). The module generates a TTL signal indicating status of the input, and the signal is stored in memory by the microprocessor. The microprocessor then sends a query message over the RS422 loop to determine the status of the main ac input to an I/O module for each of the other microcomputers. In response, each other microcomputer sends a message indicating status of its main ac input over the RS422 loop, and the microprocessor stores the message in memory. The microprocessor then tests the "battery voltage monitor" input to I/O module 72. The module generates a TTL signal indicating status of the input, and the signal is stored in memory by the microprocessor. The microprocessor then sends a query message over the RS422 loop to determine the status of the "battery voltage monitor" input to an I/O module for each of the other microcomputers. In response, each other microcomputer sends a message over the RS422 loop indicating status of its "battery voltage monitor" input, and the message is stored in memory by the microprocessor. This completes the acquisition of data required to control the lamps L1–L4 at the microprocessor's own station as well as the "10 mile" and "3 mile" red lamps at other stations.

The microprocessor then determines whether its lamp L1 filament has burned out by inspecting the stored signal indicating status of the lamp filament. See FIG. 7C. If the stored signal indicates that the lamp filament has burned out, the microprocessor commands I/O module 86 (FIG. 6D) to de-activate relay K2 thereby activating lampchanger LC1 so that lamp L2 is moved into the focal position of the upper lantern assembly in replacement of the burned out lamp L1. If the stored signal indicates that the lamp L1 filament has not burned out, the microprocessor commands I/O module 86 so as to activate relay K2 thereby locking lampchanger LC1 in the "primary" position wherein lamp L1 is retained in the focal position of the lantern assembly.

Referring to FIG. 7D, the microprocessor then inspects the stored signal representing status of its lamp L2 filament. If the stored signal indicates that the lamp L2 filament has burned out, and the lamp L1 filament has has burned out, the microprocessor commands I/O module 86 (FIG. 6D) so as to de-activate relay K1 and thereby generate the alarm output signal. If the stored signal indicates that the lamp L2 filament has not burned out, the microprocessor issues no new commands to I/O module 86. The microprocessor then inspects the stored signal indicating status of the lamp L3 filament. If the stored signal indicates that its lamp L3 filament has burned out, the microprocessor commands I/O module 86 (FIG. 6D) so as to de-activate relays K1 and K3 thereby generating the alarm output signal and activating lamp changer LC2 so as to move dc lamp L4 to the focal position of the lower lantern assembly in replacement of ac lamp L3. If the stored signal indicates that the lamp L3 filament has not burned out, the microprocessor commands I/O module 86 so as to activate relay K3 and thereby lock lampchanger LC2 in the "primary" position wherein ac lamp L3 remains in the focal position of the lantern assembly.

The microprocessor then inspects the stored messages indicating status of the ac lamps L1 of all other microcomputers in the RS422 loop. If the messages indicating status of ac lamps L1 of all other microcomputers indicate that all lamps L1 have not burned out, the microprocessor inspects the messages indicating status of ac lamps L3 of all other microcomputers. See FIG. 7E. If, however, any such message indicates that ac lamp L1 of another microcomputer has burned out, the microprocessor then inspects the stored message indicating the status of ac lamp L2 of that microcomputer. If the message indicates ac lamp L2 of the microcomputer has also burned out, the microprocessor commands I/O module 86 (FIG. 6D) so as to de-activate relay K1 and thereby generate the alarm output signal. If the message indicates that ac lamp L2 of the microcomputer has not burned out, the microprocessor inspects the messages indicating status of ac lamps L3 of all other microcomputers. See FIG. 7E.

Referring to FIG. 7E, if the stored messages indicate that any one of the ac lamps L3 of the other microcomputers in the loop has burned out, the microprocessor commands I/O module 86 (FIG. 6D) so as to de-activate relay K1 and thereby generate the alarm output signal. If the stored messages indicate that none of the ac lamps L3 of the other microcomputers have burned out, the microprocessor does not issue any new commands to I/O module 86.

The microprocessor then inspects the memory to determine the status of a flag which indicates whether relay K1 has been de-activated. Upon application of power, the flag is reset to indicate that relay K1 is activated (so that no alarm output signal can be generated), and upon de-activation of relay K1 during operation (whereby the alarm output signal is generated) the flag is set to indicate that condition. If the flag indicates that relay Kl has been de-activated, the microprocessor commands I/O module 86 (FIG. 6D) so as to activate relay K1 and thereby turn off the alarm output signal. If the flag indicates that the relay K1 has not been de-activated, the microprocessor issues no new commands to I/O module 86.

The microprocessor then determines whether all lamps other than ac lamps L1-in the configuration should be flashed in a "default" flash pattern (FIG. 10) in a "default" routine. To determine whether the "default" routine should be entered, the microprocessor first inspects the stored signal indicating status of the main ac input to its I/O module 96. See FIG. 7E. If the stored signal indicates that main ac power has been lost, the microprocessor enters the "default" routine. If the stored signal indicates that main ac power has not been lost, the microindicates processor then determines whether all of its own ac lamps L1–L3 have burned out by inspecting the stored signals indicating lamp filament L1, L2, L3 status. If the stored signals indicate that all lamps L1–L3 have burned out at the microprocessor's station the microprocessor enters the "default" routine. If the stored signals indicate that any one of the ac lamps L1–L 3 has not burned out, the microprocessor inspects the stored messages indicating status of the main ac input for each other microcomputer in the loop. If any stored message indicates that main ac power has been lost at the input for any other microcomputer, the microprocessor enters the "default" routine. If the messages indicate that main ac power has not been lost at all other microcomputers, the microprocessor then inspects the stored messages indicating status of all ac lamps L1, L2, L3 for each other microcomputer in the RS422 loop. See FIG. 7F.

Referring to FIG. 7F, if the stored messages indicate that all ac lamps L1–L3 for any other microcomputer have burned out, the microprocessor enters the "default" routine. If the messages indicate that any one of the ac lamps L1, L2, L3 for all other microcomputers has not burned out, the microprocessor proceeds to the next stage of control wherein the appropriate ac lamps at the station, as well as the "3 mile"0 red lamps, "10 mile" lamps, and "steady burn" lamps (if any) at other stations, are operated in unison. Before describing operation in the next control stage, however, operation in the "default" routine will be described, with particular reference to FIG. 7I.

Referring to FIG. 7I, the microprocessor enters the "default" routine by commanding I/O module 86 (FIG. 6D) so as to de-activate relays K1 and K3, thereby generating the alarm output signal and activating lampchanger LC2 so as to position dc lamp L4 in the focal position of the lower lantern assembly in replacement of ac lamp L3. The microprocessor also commands its I/O module 108 so as to generate the dc drive signals, in the "default" on/off pattern shown in FIG. 10, for lamp L4 and the "10 mile" lamps (if any). The microprocessor also commands I/O module 108 so as to generate steady dc signals for driving the "steady burn" lamps (if any), and it commands I/O module 94 so as to generate an ac drive signal, in the "default" on/off pattern shown in FIG. 10, for the "3 mile" red lamps (if any). The parameters G–L which determine the on/off times of the drive signals for all flashing lamps in the "default" routine are retrieved from ROM by the microprocessor so as to command I/O modules 94 and 108 appropriately.

After flashing the lamps in the "default" pattern, the microprocessor jumps to entry point "j" in the program (FIG. 7G) wherein the microprocessor determines whether it should continue to operate (whether in the "master" or "slave" role) or turn off. Before describing operation of the microprocessor in this portion of the program, operation of the program will be described to account for conditions wherein the "default" routine has not been entered.

Referring to FIGS. 7E and 7F, the "default" routine is not entered if the main ac input to I/O module 96 has not been lost, any one of the station's ac lamps L1–L3 has not burned out, main ac power to all other microcomputers in the loop has not been lost, and the lamps L1–L3 of no other microcomputer station have all burned out. Instead of entering the "default" routine, the microprocessor inspects the stored signal indicating status of the "battery voltage monitor" input to I/O module 72 (FIG. 6D). See FIG. 7F. If the stored signal indicates that the "battery voltage monitor" input has dropped below a preselected threshold stored in memory, the microprocessor commands its I/O module 86 so as to de-activate relay K1 and thereby generate the alarm output signal. If the stored signal indicates that the "battery voltage monitor" input to I/O module 72 has not dropped below the preselected threshold, the microprocessor issues no new commands to I/O module 86. The microprocessor then enters a preheat sequence wherein it commands I/O module 94 so as to generate steady ac signals for a preselected period of time such as two seconds, which signals drive its ac lamps Ll, L2, L3. Thus, the lamp L1, L2, L3 filaments are preheated in preparation for flash operation. The microprocessor then inspects a flag in memory to determine whether relay K3 has previously been deactivated. The flag is reset upon application of power to the microprocessor, and is set by the microprocessor whenever the microprocessor commands I/O module 86 to de-activate relay K3. If the flag indicates that relay K3 has previously been de-activated, so that lampchanger LC2 was moved to the "secondary" position to transfer dc lamp L4 to the focal position of the lower lamp assembly, the microprocessor commands I/O module 86 so as to activate relay K3 and thereby lock lampchanger LC2 in the "secondary" position. If the flag indicates that relay K3 has not previously been de-activated, so that ac lamp L3 is in the focal position of the lantern assembly, the microprocessor issues no new commands to I/O module 86. The microprocessor then determines whether a "synchronizing" pulse has been received during a previous cycle from any external device connected to an input of the parallel I/O circuit 120 (FIG. 6A). Such a device would be connected to I/O circuit 120 if it were desired to operate the device in synchronism with lamps L1, L2, L3. Upon receipt of the "synchronizing" pulse, the pulse is latched for subsequent detection by the microprocessor. If the microprocessor determines that such a pulse was received, the microprocessor waits for another "synchronizing" pulse from the same device. Upon detecting the latter pulse, the microprocessor determines which of its ac lamps L1, L2, L3 are to be flashed by inspecting a table stored in the ROM portion of memory 84. The table is shown in logic form in FIG. 8. If no "synchronizing" pulse has been received during a previous cycle, the microprocessor sends its own "synchronizing" pulse to the device(s) connected to the I/O circuit 120 and then determines which of its ac lamps L1, L2, L3 are to be flashed by inspecting the table stored in ROM.

Referring to FIG. 8, if all ac lamps L1, L2, L3 have burned out at the microprocessor's station, then none of the ac lamps are to be flashed and only dc lamp L4 is to be flashed (in the "default" pattern). If only ac lamp L1 has not burned out, then only that ac lamp is flashed to provide "12 mile standby" light. If only ac lamp L2 has not burned out, then only that ac lamp is flashed to provide "12 mile standby" light. If only ac lamp L3 has burned out, so that both ac lamps L1 and L2 have not burned out, then only ac lamp L1 is flashed to provide "12 mile standby" light. If only ac lamp L3 has not burned out, so that both ac lamps L1 and L2 have burned out, then only ac lamp L3 is flashed to provide "12 mile standby" light. If either ac lamp L1 or L2 has burned out and the other of ac lamps L1, L2 has not burned out, and ac lamp L3 has not burned out, then the working ac lamp L1 or L2 and ac lamp L3 are flashed in unison in response to ac signals having the on/off pattern such as that shown in FIG. 9 to provide "15 mile" light. If all ac lamps L1–L3 have not burned out, then only ac lamps L1 and L3 are flashed in unison in response to the ac drive signals having the on/off pattern such as that shown in FIG. 9 to provide "15 mile" light.

Referring to FIG. 7G, after inspecting the table stored in memory (FIG. 8), the microprocessor commands I/O module 104 (FIG. 6D) so as to turn on the appropriate solid state relays 98, 100, 102 and thereby apply the required ac signals to the filaments of those ac lamps L1, L2, L3 which are to be flashed. During flash operation, the microprocessor checks the status of the "Test Input" lines at I/O module 96 (FIG. 6D) to confirm that the solid state relays are in the conditions (on or off) commanded by I/O module 104. If the "Test Inputs" lines indicate any solid state relay 98, 100, 102 is not required condition, the microprocessor issues a command to I/O module 86 so as to de-activate relay K1 and thereby generate the alarm output signal. If the "Test Inputs" lines to I/O module 96 indicate that all solid state relays, in the required condition, then the microprocesor issues no new commands to I/O module 86. The microprocessor then commands I/O module 104 so as to generate TTL command signals in the on/off pattern such as that shown in FIG. 9 whereby the appropriate solid state relays 98, 100, 102 are enabled to gate the 88 volts ac signals to drive the appropriate ac lamps L1, L2, L3. In addition, the microprocessor commands I/O module 94 to gate an 88 volts ac signal to the "3 mile" red lamp (if any) in the on/off pattern such as that shown in FIG. 9. The microprocessor also commands I/O module 108 so as to generate dc drive signals in the on/off pattern such as that shown in FIG. 9 for the "10 mile" lamps (if any) and so as to generate steady dc drive signals for the "steady burn" lamps (if any). The TTL signals generated by the microprocessor to command I/O modules 94, 104 and 108 so as to flash ac lamps L1–L3, the "3 mile" red lamp (if any) and the "10 mile" lamp (if any) are generated in the on/off pattern such as that shown in FIG. 9. The parameters which determine the on and off times of the drive signals are retrieved by the microprocessor from memory to generate the appropriate TTL command signals for I/O modules 94, 104, 108. Note that, during this portion of the program, dc lamp L4 is not driven by I/O module 108 and remains off. Thus, dc lamp L4 is only utilized in the "default" routine as previously described.

After flashing the lamps as described above, in the "normal/alternate" or "default" modes, the microprocessor enters point "j" of the program (FIG. 7G) to determine whether it should continue (whether in the "master" or "slave" role) or turn off. Referring to FIG. 7G, the microprocessor first sends a query message over the RS422 loop to determine the status of the daylight photocells (92) for all other microcomputer stations. Referring to FIG. 7H, the microprocessor then determines whether it has received a valid message in response from all other microcomputers in the loop. See FIG. 7H. If the microprocessor has not received a valid message in response from any one of the microcomputers in the loop, this indicates that such microcomputer is not in synchronism with the microprocessor. For example, the other microcomputer may have just gone through power up reset and not yet entered its 30 second timer routine. Accordingly, the microprocessor resets all variables and returns to its own 30 second timer routine wherein it resynchronizes to all other microcomputers either in the "master" or "slave" role. If the microprocessor receives valid message responses from all other microcomputers in the loop, however, the microprocessor then determines whether any message indicates that the daylight photocell (92) for any microcomputer in the loop is active, i.e., whether the photocell indicates night time conditions. If so, the microprocessor retains its role as "slave" or "master" and returns to the "main" routine at the entry point indicated in FIG. 7B. If the daylight photocells (92) for all other microcomputers in the loop indicate daylight conditions, however, the microprocessor checks its own daylight photocell input at I/O module 72 (FIG. 6D). If the daylight photocell input indicates night time conditions, the microprocessor retains its role as "slave" or "master" and returns to the "main" portion of the program at the entry point shown in FIG. 7B. If the daylight photocell input indicates daylight conditions, the microprocessor enters a "shut down" routine wherein the microprocessor resets all variables, sends a message over the RS422 loop to indicate to all other microcomputers that the microprocessor is shutting down, and then returns to its 30 second timer routine. In response to the message, all other microcomputers shut down and then return to their 30 second timer routine.

The present invention may be embodied in other specific forms without departing from the spirit or essential attributes thereof and, accordingly, reference should be made to the appended claims, rather than to the foregoing specification, as indicating the scope of the invention.

We claim:

1. Universal synchronous marine navigation light system, comprising:

plural duplex lamp stations, each duplex lamp station being located at a predetermined position and including a first section having two or more ac lamps and a second section having at least one ac lamp, and programmed microcomputer means for operating two of said ac lamps at said station in a normal on/off pattern in unison in a first mode and only one of said ac lamps at said station in said normal on/off pattern in a second mode, and means for interconnecting said microcomputer means for each of said duplex stations in a communications loop, each of said microcomputer means being programmed so as to operate said lamps in said plural lamp stations in synchronism.

2. Universal synchronous marine navigation light system according to claim 1 wherein said second section has at least one dc lamp and said microcomputer means at said station is programmed to operate only said dc lamp at said station in a default on/off pattern in a third mode, said normal and default on/off patterns being different.

3. Universal synchronous marine navigation light system, comprising:

plural duplex lamp stations, each duplex lamp station being located at a predetermined position and including a first section having two or more ac lamps, a second section having at least one ac lamp and a dc lamp, and programmed microcomputer means for operating two of said ac lamps at said station in a normal on/off pattern in unison in a first mode, only one of said ac lamps at said station in said normal on/off pattern in a second mode, and only said dc lamp at said station in a default on/off pattern in a third mode, said normal and default on/off patterns being different, and means for interconnecting said microcomputer means for each of said duplex stations in a communications loop, each of said microcomputer means being programmed so as to operate said lamps in said plural lamp stations in synchronism.

4. Universal synchronous marine navigation light system according to claim 2 or 3 wherein each section of said duplex lamp station includes a motorized lamp changer for mechanically replacing one lamp of a section with another lamp of the same section, and wherein said microcomputer means includes means for detecting failure of an ac lamp at said first section of said station and for generating a signal based thereon and means for operating said first section motorized lampchanger so as to mechanically replace a burned out ac lamp with a working ac lamp in response to said signal.

5. Universal synchronous marine navigation light system according to claim 4 wherein said microcomputer means at a duplex lamp station includes means for detecting failure of all of said ac lamps at said first and second sections of said station and for generating a signal based thereon and means for operating said second section motorized lampchanger so as to mechanically replace a burned out ac lamp with a working dc lamp in said second section in response to said signal.

6. Universal synchronous marine navigation light system according to claim 1 or 3 wherein said microcomputer means at a duplex lamp station includes means for altering said normal on/off pattern so as to operate said ac lamps in an alternate on/off pattern in either of said first and second modes, said normal and alternate on/off patterns being different.

7. Universal synchronous marine navigation light system according to claim 2 or 3 wherein said microcomputer means at a duplex lamp station includes means for detecting an interruption in an ac power supply and for generating a signal based thereon, said last-mentioned microcomputer means being programmed so as to operate said dc operated lamp in said default on/off pattern in said third mode in response to said signal.

8. Universal synchronous marine navigation light system according to claim 2 or 3 wherein said microcomputer means at a duplex lamp station includes means for detecting a low condition of a dc power supply and for generating a signal based thereon, said last-mentioned microcomputer means being programmed so as to operate said dc lamp in said default on/off pattern in said third mode in response to said signal.

9. Universal synchronous marine navigation light system according to claim 1 or 3 including at least one lamp station located at another predetermined position and having two or more dc lamps operatively connected to at least one of said duplex lamp station microcomputer means, said last-mentioned microcomputer means being programmed so as to operate a dc lamp at said at least one lamp station in unison with at least one ac lamp at said last-mentioned duplex lamp station.

10. Universal synchronous marine navigation light system according to claim 9 wherein said at least one lamp station includes a motorized lampchanger for mechanically replacing one of said two or more dc lamps with another of said last-mentioned lamps.

11. Universal synchronous marine navigation light system according to claim 1 or 3 wherein said communication loop is a RS422 communications loop.

12. Universal synchronous marine navigation light system according to claim 1 or 3 wherein said microcomputer means at a duplex lamp station includes means for detecting failure of an ac lamp at said station and for generating an alarm output signal based thereon.

13. Universal synchronous marine navigation light system according to claim 1 or 3 wherein said microcomputer means at a duplex lamp station includes means for detecting failure of a lamp at said station and for generating a message based thereon over said communications loop, said last-mentioned microcomputer means being programmed to detect such a message over said communications loop and to generate an alarm output signal based thereon.

14. Universal synchronous marine navigation light system according to claim 1 or 3 wherein said microcomputer means at a duplex lamp station includes means for testing said ac lamps.

15. Universal synchronous marine navigation light system according to claim 7 wherein said microcomputer means at said duplex lamp station includes means for generating an alarm output signal based on said signal.

16. Universal synchronous marine navigation light system according to claim 8 wherein said microcomputer means at said duplex lamp station includes means for generating an alarm output signal based on said signal.

17. Universal synchronous marine navigation light system according to claim 7 wherein said microcomputer means at said duplex lamp station includes means for generating a message over said communications loop based on said signal, said last-mentioned microcomputer means also being programmed to detect such a message over said communications loop and generate an alarm output signal based thereon.

18. Universal synchronous marine navigation light system according to claim 8 wherein said microcomputer means at said duplex lamp station includes means for generating a message over said communications loop based on said signal, said last-mentioned microcomputer means being programmed to detect such a message over said communications loop and to generate an alarm output signal based thereon.

19. Universal synchronous marine navigation light system according to claim 5 wherein said microcomputer means at said duplex lamp station includes means for generating a message over said communications loop based on said signal, said last-mentioned microcomputer means being programmed to detect such a message over said communications loop and to generate an alarm output signal based thereon.

20. Universal synchronous marine navigation light system according to claim 1 or 3 wherein said microcomputer means at a duplex lamp station includes means for detecting daylight and night time conditions and for generating a signal based thereon, and means for generating a message over said communications loop based on said signal, said last-mentioned microcomputer means being programmed to detect such a message over said communications loop and shut down if said signal and said detected message indicate day light conditions.

* * * * *